US007905306B2

(12) United States Patent
Kramer et al.

(10) Patent No.: US 7,905,306 B2
(45) Date of Patent: Mar. 15, 2011

(54) HOME CARE EQUIPMENT SYSTEM

(75) Inventors: Kenneth L. Kramer, Greensburg, IN (US); Marshall S. Dahneke, Batesville, IN (US); Reed N. Wilcox, Ridgefield, CT (US); Franz R. Gaag, Genthod (CH); David T. Schwanemann, Cincinnati, OH (US); Rainer B. Teufel, Worthington, OH (US); Peter A. Koloski, Upper Arlington, OH (US); Thornton K. Lothrop, Worthington, OH (US); Ryan R. Berger, Columbus, OH (US)

(73) Assignee: Hill-Rom Services, Inc., Batesville, IN (US)

(*) Notice: Subject to any disclaimer, the term of this patent is extended or adjusted under 35 U.S.C. 154(b) by 0 days.

(21) Appl. No.: 12/472,220

(22) Filed: May 26, 2009

(65) Prior Publication Data

US 2009/0236165 A1 Sep. 24, 2009

Related U.S. Application Data

(63) Continuation of application No. 11/204,633, filed on Aug. 16, 2005, now Pat. No. 7,537,069.

(60) Provisional application No. 60/601,924, filed on Aug. 16, 2004, provisional application No. 60/611,407, filed on Sep. 20, 2004.

(51) Int. Cl.
*B60K 1/02* (2006.01)

(52) U.S. Cl. .................... 180/65.1; 180/907; 280/304.1; 280/250.1

(58) Field of Classification Search .................. 180/907, 180/65.1; 280/304.1, 250.1, 200
See application file for complete search history.

(56) References Cited

U.S. PATENT DOCUMENTS

| | | | | |
|---|---|---|---|---|
| 4,326,622 | A | | 4/1982 | Ellzey |
| 4,413,693 | A | | 11/1983 | Derby |
| 4,987,896 | A | | 1/1991 | Nakamatsu |
| 5,023,967 | A | | 6/1991 | Ferrand |
| 5,050,708 | A | | 9/1991 | Wood |
| 5,155,873 | A | | 10/1992 | Bridges |
| 5,199,113 | A | | 4/1993 | Glasow et al. |
| 5,269,227 | A | | 12/1993 | Warren et al. |
| 5,363,771 | A | * | 11/1994 | Warren et al. ................ 105/29.1 |
| 5,411,044 | A | | 5/1995 | Andolfi |
| 5,547,038 | A | * | 8/1996 | Madwed ....................... 180/253 |
| 5,553,548 | A | | 9/1996 | Eaton |
| 5,572,930 | A | | 11/1996 | Hein |
| 5,575,348 | A | | 11/1996 | Goertzen et al. |
| 5,651,149 | A | | 7/1997 | Garman |
| 5,690,185 | A | | 11/1997 | Sengel |
| 5,697,465 | A | | 12/1997 | Kruse |
| 5,718,442 | A | | 2/1998 | Alexander et al. |
| 5,735,088 | A | | 4/1998 | Hashino |
| 5,772,226 | A | | 6/1998 | Bobichon |

(Continued)

OTHER PUBLICATIONS

Shoprider Product Catalog, date unknown, twenty-seven pages.

(Continued)

*Primary Examiner* — J. Allen Shriver, II
*Assistant Examiner* — Erez Gurari
(74) *Attorney, Agent, or Firm* — Barnes & Thornburg LLP

(57) ABSTRACT

A system for assisting a person of limited mobility in moving from room to room within a home and performing essential daily activities includes a personal mobility device which includes transfer drivers which engage a transfer system to transition from a first elevation to a second elevation.

20 Claims, 16 Drawing Sheets

U.S. PATENT DOCUMENTS

| | | | | |
|---|---|---|---|---|
| 5,848,658 | A | 12/1998 | Pulver | |
| 5,853,059 | A | 12/1998 | Goertzen et al. | |
| 5,927,423 | A | 7/1999 | Wada et al. | |
| 6,041,876 | A | 3/2000 | Pulver et al. | |
| 6,070,898 | A | 6/2000 | Dickie et al. | |
| 6,129,165 | A | 10/2000 | Schaffner et al. | |
| 6,155,382 | A | 12/2000 | Duijnstee | |
| 6,175,982 | B1 | 1/2001 | Cushwa | |
| 6,179,076 | B1 | 1/2001 | Fernie et al. | |
| 6,186,252 | B1 | 2/2001 | Schaffner et al. | |
| 6,196,343 | B1 | 3/2001 | Strautnieks | |
| 6,199,647 | B1 | 3/2001 | Schaffner et al. | |
| 6,220,382 | B1 | 4/2001 | Kramer, Jr. et al. | |
| 6,279,927 | B1 | 8/2001 | Nishihira et al. | |
| 6,332,512 | B1 | 12/2001 | Muranaka | |
| 6,341,657 | B1 | 1/2002 | Hopely, Jr. et al. | |
| 6,405,816 | B1 | 6/2002 | Kamen et al. | |
| 6,431,650 | B1 * | 8/2002 | Visone | 297/339 |
| 6,460,641 | B1 | 10/2002 | Kral | |
| 6,530,445 | B1 | 3/2003 | Flowers et al. | |
| 6,554,086 | B1 | 4/2003 | Goertzen et al. | |
| 6,601,863 | B1 | 8/2003 | Mentessi et al. | |
| 6,604,471 | B1 | 8/2003 | Tarver, Jr. | |
| 6,684,969 | B1 | 2/2004 | Flowers et al. | |
| 6,752,230 | B1 | 6/2004 | Huang | |
| 6,923,278 | B2 | 8/2005 | Mulhern et al. | |
| 6,935,448 | B2 | 8/2005 | Goertzen et al. | |
| 6,938,923 | B2 | 9/2005 | Mulhern et al. | |
| 6,957,716 | B1 | 10/2005 | Norris | |

OTHER PUBLICATIONS

Pride Scotters, Pride Mobility Products Corp., Oct. 2, 2003, twenty pages.

Jazzy Power Chairs, Pride Mobility Products Corp., date unknown, twenty-three pages.

Give Your Life a Lift, Acorn Stairlifts, date unknown, eight pages.

Select Bath Cruise, date unknown, four pages.

Bishamon, Sugiyasu Corporation, date unknown, four pages.

Yamaha, Touching Your Heart, date unknown, one page.

National Security & Safety System, Matsushita Electric Works Ltd., 2004, eight pages.

Innovative Healthcare Merits, Power Mobility Products, 2005, forty-eight pages.

Sunua, Stair Aid, date unknown, one page.

Kirchner Treppenlift GmbH, date unknow, four pages.

Select Bath Ocean, Amano Medical and Welfare Instruments and Machinery, 2004, eight pages.

Written Opinion and International Search Report for PCT/US05/29229, mailed Jun. 20, 2008, ten pages.

* cited by examiner

HOME CARE EQUIPMENT SYSTEM

This application is a continuation of application Ser. No. 11/204,633, filed Aug. 16, 2005 (now U.S. Pat. No. 7,537,069, issued May 26, 2009), which claims the benefit, under 35 U.S.C. §119(e), of U.S. Provisional Patent Application Ser. Nos. 60/601,924, filed Aug. 16, 2004 and 60/611,407, filed Sep. 20, 2004, each of which is hereby incorporated by reference herein in its entirety.

BACKGROUND OF THE INVENTION

The present disclosure relates to personal care and assistance products for use in the home. The disclosure includes toileting devices, combination bathing and toileting devices, wheelchair accessible bathing devices, laterally accessible chairs, articulating beds, and a system for transferring an individual from one elevation to a second elevation which includes a personal mobility device.

Improved medical care is resulting in an aging population with a high level of independence. This aging population has minor to moderate need for assistance in caring for themselves. A significant issue in this independence is the lack of facilities within the home to accommodate the reduced mobility of this population. The typical toileting, bathing, and furniture in the home are not suited for persons who have limited strength and mobility. Various products have been developed to address specific mobility and assistance needs, but the integration of the devices is lacking across the continuum of basic life activities experienced by individuals throughout the day. These basic life activities define the independence of individuals. The result is a need for a system for the home which provides independence across all of the basic life activities to provide a sense of independence for mobility challenged individuals.

SUMMARY OF THE INVENTION

The present invention comprises one or more of the features recited in the appended claims and/or the following features which, alone or in any combination, may comprise patentable subject matter:

A system for assisting a person of limited mobility in moving from room to room within a home and for performing essential daily activities includes a personal mobility device. The personal mobility device may include a frame, a plurality of wheels coupled to the frame, a seat supported on the frame, and a transfer driver to provide locomotion for the personal mobility device to navigate up and down stair systems. The transfer driver may engage with a transfer guide which is located adjacent stair treads along a stairway such that the transfer guide guides the movement of the personal mobility device as the device transverses the stairway.

In some embodiments, the transfer driver may have external teeth which intermesh with internal teeth of the transfer guide to facilitate the movement of the personal mobility device along the transfer guide. The personal mobility device may include a motor which provides output to drive the transfer driver. In some embodiments, the personal mobility device may further comprise a battery to provide power to the motor.

The transfer driver may be moveable between a retracted position, wherein the transfer driver is contained within a horizontal perimeter of the seat so as to permit the personal mobility device to move within a home without the transfer driver interfering with surrounding home furnishings and structures, and an extended position wherein the transfer driver is positioned to engage with the transfer guide. The personal mobility device may also include user inputs which control operation of the personal mobility device, including the operation of the transfer driver.

In some embodiments, the seat may include a first portion having an upwardly facing surface for supporting the buttocks of a person supported on the seat and a second portion pivotably coupled to the first portion and positioned to support the back of the person. In some embodiments, the angle between the first portion and the second portion may be adjustable. In embodiments where the angle between the first portion and the second portion is adjustable, the second portion may be lockable in a plurality of positions relative to the first portion.

In some embodiments, the personal mobility device may further include an armrest coupled to the seat. The armrest may be coupled to the first portion or the second portion. In some embodiments, the armrest may be pivotable in a horizontal axis to allow the armrest to move between a use position adjacent the seat and an out-of-the-way position to permit a person occupying the seat to enter or exit the seat from the side. In some embodiments, the armrest may be pivotable in a vertical axis to allow the armrest to move between a use position adjacent the seat and an out-of-the-way position to permit a person occupying the seat to enter or exit the seat from the side. In still other embodiments, the armrest may be pivotable in both the horizontal and vertical axes. The user input devices may be located on the armrests. In some embodiments, user input devices may be located on the side of the seat.

In some embodiments, the armrest may be coupled to the back and may be pivotable about a horizontal axis between a use position and an out-of-the-way position. In still other embodiments, the armrest may be coupled to the back and may be pivotable about a vertical axis between a use position and an out of-the-way position. Further, the armrest may be coupled to the back and pivotable about both a horizontal and a vertical axis between a use position and an out-of-the-way position.

In some embodiments, the personal mobility device may be configured to be mounted by from the rear with a person supported by an integrated support supporting the person in an upright position by providing support under the person's arms. In other embodiments, a person may be supported on the personal mobility device in a sitting position and the personal mobility device may have a combination back and support armrest which transverses the back of the seat from one side to the opposite side.

In some embodiments, user inputs to control the operation of the personal mobility device may be coupled to an armrest of the personal mobility device. In other embodiments, user inputs may be located on the side of a seat of the personal mobility device or on an intermediate frame of the personal mobility device. User input devices may include joysticks, buttons, twist throttle devices, squeeze handles, triggers, or the like. In some embodiments, control of the personal mobility device may be controlled by a combination of inputs such as the operation of multiple joysticks or multiple squeeze handles. A combination input may be received by pushing a left joystick and a right joystick forward to move forward, for example. Pushing only one joystick forward may induce a turn, for example.

The personal mobility device may further include a leg pivotably coupled to the lower frame and configured to pivot about a vertical axis to change the position of the leg relative to a person sitting on the seat. The leg may pivot between a first position wherein the leg extends generally laterally relative to a person sitting on the seat and a second position wherein the leg extends generally longitudinally relative to the person sitting on the seat. In the second position, the operative width of the personal mobility device may be narrowed to allow the personal mobility device to navigate through a narrow passage in a home without interfering with home furnishings.

The personal mobility device may include a drive wheel coupled to the leg and operable to move the personal mobility device across a floor or other surface. In some embodiments, the personal mobility device may include additional non-driven wheels. In still other embodiments, the personal mobility device may include a plurality of driven wheels.

In some embodiments, the personal mobility device may further include an intermediate frame supported on the lower frame and the seat may be supported on the intermediate frame. The intermediate frame may be extended to raise the seat and thereby change the vertical position of the seat relative to the lower frame. The personal mobility device may further include a footrest pivotably coupled to the intermediate frame and pivotable about a horizontal axis. The footrest may be adjustable to adjust the angle of relationship between footrest and the intermediate frame. In embodiments where the angle between the footrest and the intermediate frame is adjustable, the footrest may be lockable in a plurality of positions.

The transfer guide may include a first horizontal portion configured to receive or release the transfer driver, an elevation portion coupled to the first horizontal portion and oriented to direct the personal mobility device to a second horizontal portion coupled to the elevation portion and at a different elevation from the first horizontal portion, the second horizontal portion configured to receive or release the transfer driver. In some embodiments, the transfer driver may comprise a plurality of vertically spaced transfer drivers and the transfer guide may comprise a plurality of transfer guides configured to receive or release the vertically spaced transfer drivers to maintain the personal mobility device at a substantially constant orientation with respect to horizontal during the transfer between a first elevation and a second elevation.

In some embodiments, a personal mobility device may include a drive ball driven in a first direction by a first drive wheel driven by a first motor and driven in a second direction by a second drive wheel driven by a second motor. The first and second drive wheels may operate simultaneously such that the drive ball is driven in a direction that is a resultant direction based on the direction and speed of the first and second drive wheels. A personal mobility device may include multiple drive balls coupled to the lower frame of the personal mobility device and engaged with the floor.

In other embodiments, a personal mobility device may be driven by a drive system having a plurality of drive wheels which rotate independently. The axis of rotation of each of the drive wheels may be parallel. Each drive wheel may be operated at a different speed and/or a different direction to drive the personal mobility device in a resulting direction. In some embodiments, the axis of rotation of the drive wheels may be common among all of the drive wheels and intersect the central vertical axis of the personal mobility device. In other embodiments, the axis of rotation of the drive wheels may be common and may be distal to a central vertical axis of the personal mobility device. In some embodiments, the personal mobility device may further comprise stability wheels spaced horizontally from the drive wheels to provide reduce the potential for tipping the personal mobility device. In embodiments where the drive wheels are distal to the central vertical axis of the personal mobility device, a stability wheel may be positioned opposite the central vertical axis from the drive wheels to trail motion of the drive wheels and vertically stabilize the personal mobility device.

In some embodiments, the seat or the back may be temperature controlled. Either the seat or the back or both the seat and the back may be heated by a heater or cooled by a cooler. In other embodiments, the seat or back of the personal mobility device may provide massage to a person supported on the device. In some embodiments, the seat or the back may comprise an air bladder for support of the person supported on the device.

The system for assisting a person of limited mobility in moving from room to room within a home and performing essential daily activities also includes a powered walker comprising a frame, a plurality of drive wheels coupled to the frame, to support handles coupled to the frame and positioned to be gripped by a person using the power walker, and a plurality of support rollers. The drive wheels may be powered by a motor coupled to the drive wheels through a drive linkage and responsive to control inputs from a user of the powered walker. A person using the powered walker may control the speed and direction of the powered walker through inputs on the handles utilized by the person for support.

In a first configuration, the powered walker may operate as a standard walker with power assist to provide assistance to a mobile person and thereby reduce the amount of exertion in walking. In a second configuration, the powered walker may be converted to a personal mobility device which permits a person to mount an articulable seat on the powered walker and utilize the powered wheels as locomotion for the person. The articulable seat may be pivotable about a horizontal axis from a stowed position wherein the articulable seat is contained within the confines of the frame of the powered walker to a use position wherein the articulable seat is in a horizontal orientation. The articulable seat may further comprise a trailing wheel to provide additional support for the weight of the persons seated on the articulable seat while the powered walker is being used in the second configuration.

The support handles of the powered walker may pivot about a horizontal axis from a support position when the powered walker is in the first configuration to a nonsupport position when the powered walker is in the second configuration. In the nonsupport position, the support handles may be positioned to such that a person supported on the articulable seat may access the controls of the powered walker in the seated position. The support rollers may be positioned to act as foot supports for a person utilizing the powered walker in the second configuration.

The system for assisting a person of limited mobility in moving from room to room within a home and performing essential daily activities further includes a toilet adapted for the mobility challenged. The toilet may comprise a bowl, a seat pivotably coupled to the bowl, and a lid pivotably coupled to the bowl. In some embodiments, the bowl may be vertically adjustable to change a height of the toilet. In other embodiments, the seat may be vertically adjustable to provide an appropriate height for a person of limited mobility. The seat and/or the bowl may be powered to assist with the vertical adjustment of the seat and/or the bowl.

In some embodiments, the bowl and or the seat may be configured to provide for mounting of the seat and/or the bowl from a straddled position wherein a person utilizing the toilet mounds the toilet in a forward facing orientation. In other embodiments, the seat and/or bowl may be raised such that a person may utilize the toilet in a semi-standing position. The bowl and/or seat may be angled such that a person utilizing the toilet in a semi-standing position may lean against the toilet seat during toileting.

In some embodiments the seat may be heated. Further, the bowl may comprise a spray nozzle within the bowl oriented to spray water onto a person utilizing the toilet. Also, the bowl may comprise a blower within the bowl, the blower oriented to blow air onto a person utilizing the toilet. In some embodiments, the air and/or water may be temperature controlled by a heater and/or a cooler, for example.

In some embodiments, the toilet may be positioned in a toileting area, the toileting area having support and assist devices positioned and configured to assist a person of limited mobility with mounting and dismounting the toilet. For example, the toilet area may include an assist arm coupled to a wall behind the toilet or coupled to a wall beside the toilet. In some embodiments an assist arm may be pivotable from a use position to an out-of-the-way position so that person of limited mobility may pivot the assist arm between the use and out-of-the-way positions. Further, and assist arm may be coupled to a ceiling and pivotable between a use position and an out-of-the-way position. In some embodiments, an assist arm may be powered such that a person utilizing the assist arm may be lifted from a seated position to a standing position during articulation of the assist arm.

The system for assisting a person of limited mobility in moving from room to room within a home and performing essential daily activities still further includes a shower which may comprise an enclosure, a spray head, and a floor drain. The shower may further comprise a powered assist mounted in an overhead configuration and operable to move an assist handle vertically to assist a person in transitioning between sitting and standing positions within the shower enclosure. In other embodiments, and assist arm may be coupled to a side of the enclosure and may be pivotable between a use position and an out-of-the-way position. In some embodiments, the assist arm may be powered and configured to assist a person in moving between the outside of the enclosure and the inside of the enclosure. Further, the assist arm may be coupled to the ceiling and pivotable between an out-of-the-way position and a use position.

In some embodiments the shower may include a light within the enclosure. In still other embodiments the shower may include an integrated seat for supporting a person during showering. In some embodiments the seat may be pivotable between a stowed position and a use position. The shower may further comprise a moveable spray head mounted overhead within the enclosure and movable to a plurality of positions within the enclosure.

The system for assisting a person of limited mobility in moving from room to room within a home and performing essential daily activities may also include a combination the shower and toilet which includes features as both the toilet discussed above and the shower discussed above. Further, the combination shower and toilet may also comprise an enclosure having a closeable top. When the shower and toilet are utilized in combination, the toileting area may comprise the enclosure for the shower. The combination toilet and shower may be configured such that a person may perform toileting activities within the combination shower and toilet while simultaneously showering. In some embodiments, the combination shower and toilet may include multiple shower heads and/or jets positioned on the walls of the enclosure to assist with showering.

The combination shower and toilet may comprise privacy doors which permit visual contact between an assistant assisting a person utilizing the combination shower and toilet while maintaining privacy for the person during toileting and/or showering activities. The privacy doors may comprise swing-out doors which cover a portion of an opening of the enclosure. The combination shower and toilet may also comprise a tambour door which may be lowered by a person utilizing the combination shower and toilet for privacy. Still further, the combination shower and toilet may comprise a shower curtain to prevent spray from the shower from exiting the combination shower and toilet.

The combination shower and toilet may comprise an assist arm moveable from between a use position and an out-of-the-way position. The assist arm may be coupled to a wall, to a ceiling, or within the enclosure. In some embodiments, the assist arm may be floor-mounted within the shower enclosure and articulable between a support position within the enclosure and an egress position wherein a person is supported by the assist arm outside of the enclosure. The assist arm may provide support to the person by supporting the arms of the person or supporting the person under the arms. The assist arm may be powered to provide assistance to an individual in transitioning between seated and standing positions.

In some embodiments, the shower may comprise a moveable shower head with a hose so that water may be directed by a person using the shower or shower and toilet combination as necessary to bathe.

The system for assisting a person of limited mobility in moving from room to room within a home and performing essential daily activities may still further include a bathing apparatus. The bathing apparatus may comprise a tub having a closeable door configured to permit easy entry and exiting by a person of limited mobility. In some embodiments, the tub may include a semicircular tub door configured to permit a person to enter the tub on a personal mobility device such as a wheelchair, for example. The tub may include a main portion and a wheelchair accessible portion. In some embodiments, the door may pivot about a substantially vertical axis between an open position and a substantially watertight closed position. In other embodiments, the door may pivot about a substantially horizontal axis between a lowered position wherein the door is useable as a ramp for a wheelchair or a person utilizing a walker and a substantially watertight closed position.

The bathing apparatus may further comprise a seat located within the tub. In some embodiments the seat may be pivotable between a use position and a stowed position. In other embodiments, the seat may be formed as a permanent structure within the tub. The seat may further include jets to spray water on portions of the body of a person occupying the seat which are not exposed and available for showering or bathing with a standard shower head. The tub may further comprise non-skid material within the tub to prevent a person of reduced mobility from slipping.

The bathing apparatus may further comprise an assist arm movable to assist a person from transitioning between a standing position and a seated position. In some embodiments, the assist arm may be powered. The bathing apparatus may also comprise a seat positioned outside of the bathing area of a tub for an assistant to set while assisting a person occupying the tub during bathing. In some embodiments the seat may be slideable between a plurality of positions. The seat may also be pivotable between a use position wherein an assistant may be seated on the seat and an out-of-the-way position wherein the seat is stowed.

The system for assisting a person of limited mobility in moving from room to room within a home and performing essential daily activities may yet still further include an articulating chair configured to provide for easy ingress and egress by a person of limited mobility. The chair may comprise a frame, a seat supported on the frame, a back supported on the frame and pivotable relative to the seat, and a leg support on the frame and pivotable relative to the seat. The back may be powered and the leg support may be powered independently of the back. In some embodiments, the back and the leg may articulate in unison between a sitting position and a reclined position.

In some embodiments the chair may further comprise articulable armrests which move between a use position and an out-of-the-way position. In the out-of-the-way position, the armrests may be positioned to provide clearance for a person to enter or exit the chair laterally. In some embodiments the armrest may form a support surface to support the lateral transfer.

The chair may further comprise an attached table adjacent the seat of the chair and articulable between an out-of-the-way position and a use position. Still further, the chair may comprise a storage module adjacent the chair, the storage module including a storage area, a cover for the storage area, and an armrest supported on the cover. The armrest may be pivotable to an out-of-the-way position such that the cover serves as a support for lateral transfer. The storage area may be temperature controlled.

The system for assisting a person of limited mobility in moving from room to room within a home and performing essential daily activities may include a personal relaxation system. The relaxation system may comprise an articulating bed with multiple articulating sections. The bed may comprise multiple bed portions, each portion including multiple articulating sections such that more than one person may occupy the relaxation system and adjust the bed portion of the system to a particular configuration. The bed portions may comprise a massage system to provide massage to a person supported on the bed portion. The bed portion may also comprise a system of air cells to support a person positioned on the bed portion. The air cells may be configured to be selectively and alternately rapidly inflated and deflated to provide massage to a person positioned on the bed portion. The bed portions may also be heated to provide temperature input to a person occupying the personal relaxation system.

The relaxation system may further comprise a canopy articulable between an open position and a closed position. In the closed position, the canopy may substantially filter noise from outside the canopy so as to provide an occupant of the relaxation system a generally quiet environment. In the closed position, the canopy may form a projection screen for the projection of various images.

The relaxation system may also comprise a video projection system configured to project video images on the closed canopy. Also, the relaxation system may comprise a speaker, a CD player, a radio tuner, an aromatherapy device, or a temperature control device. The various components of the relaxation system may provide traditional entertainment in the form of music, movies, and television. Additionally, the relaxation system may be programmed to operate in conjunction with the massage, articulation, and heating of the bed portions to provide a relaxation therapy to a person or to persons occupying the relaxation system.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
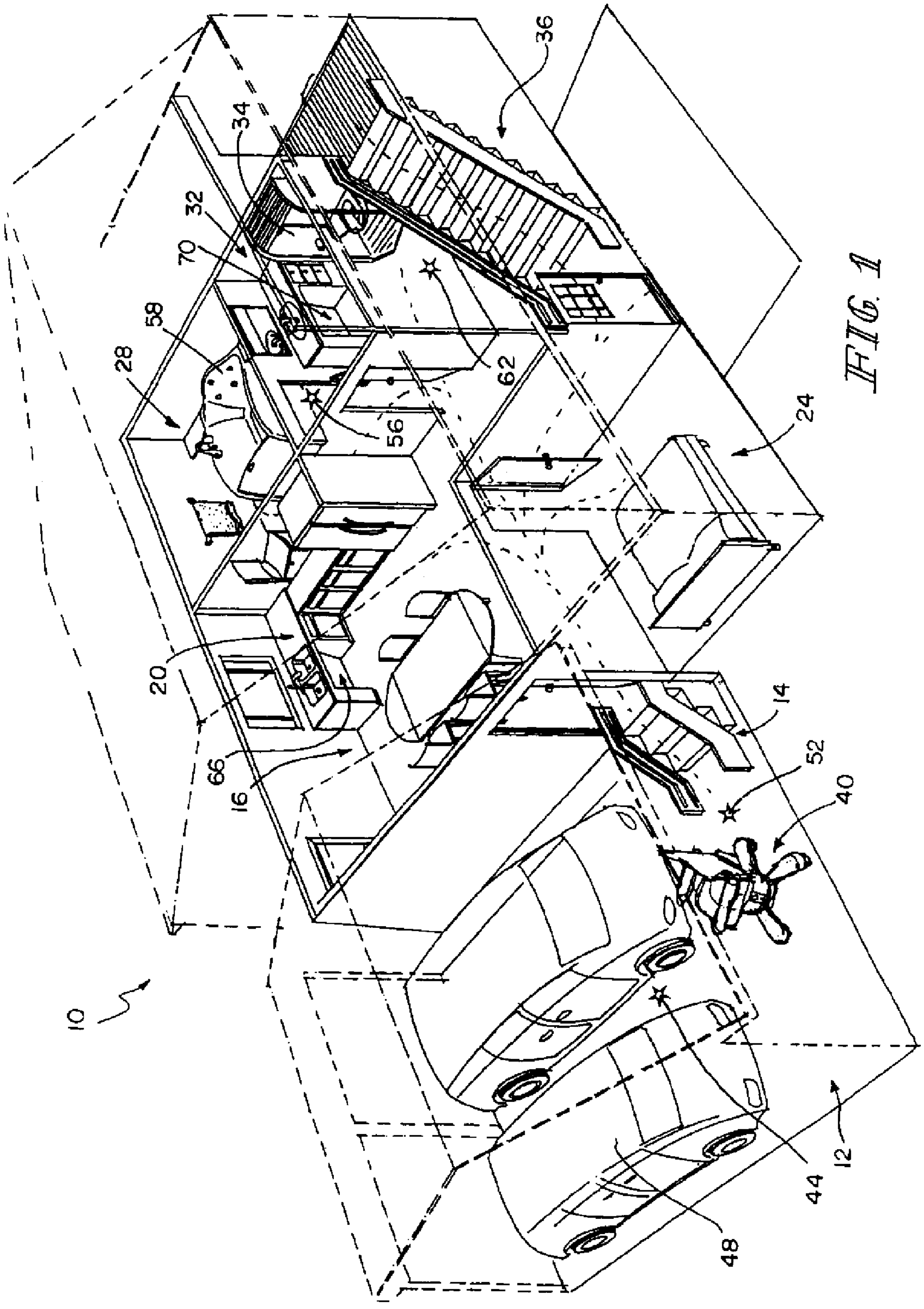
FIG. 1 is a perspective view of the first floor layout of a home.

FIG. 1 is a view of the first floor layout of a home 10. The home includes a garage 12, a system of stairs 14 connecting the garage 12 to the interior of the home 10, a dining room area 16, a kitchen 20, a bedroom 24, a bathroom 28 with a bath tub 58, a toilet and washing room area 32, a shower and toilet combination system 34, another system of stairs 36 leading to upstairs, and a personal mobility device 40. In each of these areas, persons utilize their motor functions to accomplish daily tasks of living.

For example, the star 44 represents a transition from a seat of a car 48 to standing position. The star 52 represents a transition between a floor and a system of stairs 14. The star 56 represents a transition between a standing position and a reclining position in a bath tub 58. The star 62 represents a transition from or to the shower and toilet combination system 34. All of these transitions require utilization of motor faculties and can be especially difficult for mobility challenged individuals. In an aging population, these transitions become more difficult and a typical home is not suited to ease the strength and dexterity required to make these transitions.

The present disclosure provides a system of devices and apparatus which may be used in a typical home to ease the stress of these transitions on those persons who may not be as strong or agile as the typical population. The home is also designed to be friendly to mobility challenged individuals. For example, the sink area 66 and the washing area 70 are designed to be personal mobility device assessable.

Figure 2:
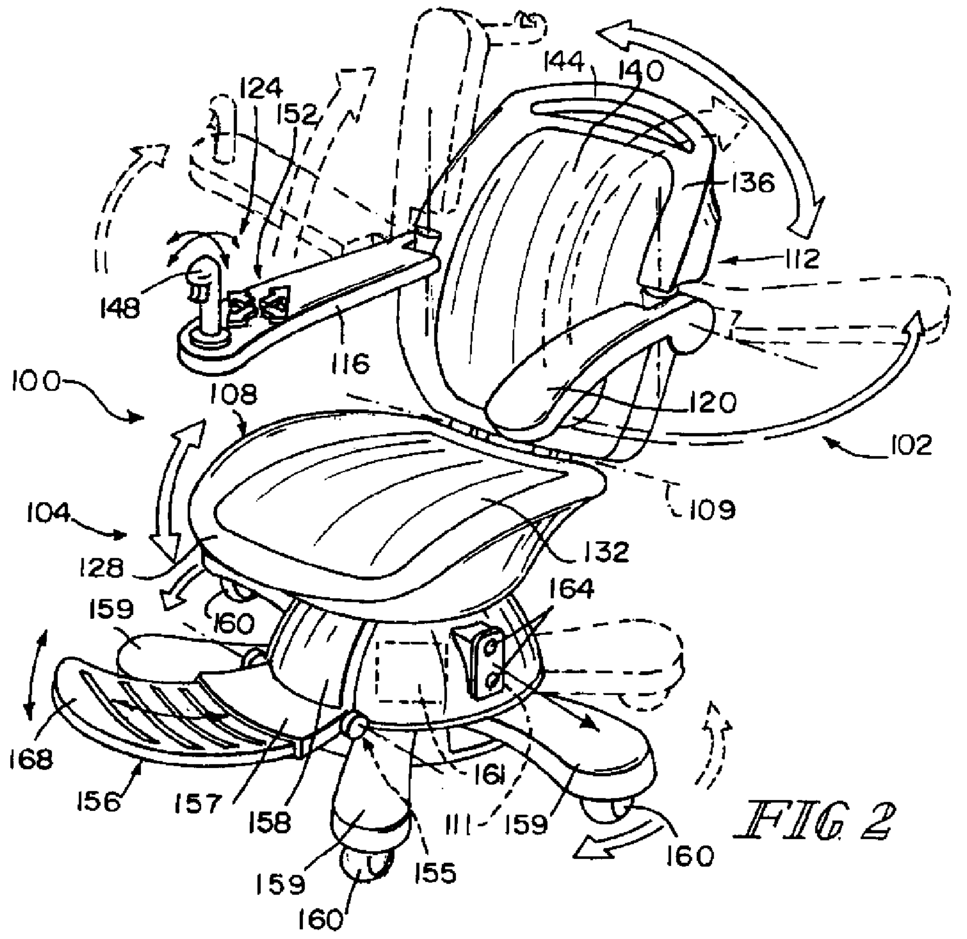
FIG. 2 is a perspective view of a powered personal mobility device.

FIG. 2 is a perspective view of a powered personal mobility device 100 which is configured to assist mobility challenged individuals in performing daily tasks of life. The personal mobility device 100 has an upper portion 102 and a lower portion 104. The upper portion 102 includes a seat 108, a back 112 pivotably coupled to the seat 108, two armrests 116 and 120 pivotably coupled to the back 112, and a control input 124 coupled to the arm 116. The seat 108 has a frame 128 and a support area 132. The support area 132 is a fabric material or a similar material stretched across and coupled to the frame 128. The seat 108 is pivotably coupled to the frame 157 in the lower portion 104 of the personal mobility device 100 such that the seat 108 pivots about a horizontal axis 111. The back 112 is a similar construction to the seat having a frame 136 and a support area 140. The support area 140 is a fabric material or similar stretched across and coupled to the frame 136. The fabric or similar material allows the free passage of air to reduce heat buildup on a person occupying the personal mobility device 100. The back 112 is pivotably coupled to the seat 108 and pivots about a horizontal axis 109 such that the angle between the seat 108 and the back 112 is adjustable to provide a person occupying the personal mobility device 100 the ability to adjust the angle therebetween.

The back 112 further includes a grip 144, which may be used by a person to move the personal mobility device 100 by pushing or pulling the personal mobility device 100. The two armrests 116 and 120 are pivotably coupled to the frame 136 of the back 112 in and pivotable in two axes. Axis 113 is parallel to the longitudinal axis of the back 112 and axis 115 is horizontal relative to seat 108. The pivoting of the armrests 116 and 120 allows the armrests 116 and 120 to be pivoted between a use position as shown in solid in FIG. 2 and out-of-the-way positions in vertical or in horizontal as shown in phantom in FIG. 2, so that a lateral transfer of a person from or to the personal mobility device 100 can be achieved. This ability to perform lateral transfer provides an alternative for an individual who may not be able to enter or exit the personal mobility device by moving between a sitting and a standing position. The armrests 116 and 120 are lockable in either the use position or the out-of-the-way position as necessary to facilitate the transfer.

The control input 124 is a combination of joystick 148 and a multi-directional push button 152. The control input 124 is electrically connected to a controller (not shown). The control input 124 is located on the end of armrest 116 and is configured to be easily gripped by the hands of an occupant of the personal mobility device 100. The direction of and force exerted on the joystick 148 or the direction of and the force on the multi-directional push button 152, both controlled by the occupant, adjust the direction and the speed of the personal mobility device 100.

The upper portion 102 is mounted on the lower portion 104 where the bottom of the seat frame 128 interfaces with a frame 158 of the lower portion 104. The lower portion 104 includes a foot rest 156, a foot rest bracket 157, a frame 158, a controller (not shown), a drive system (not shown), a lift mechanism (not shown), multiple legs 159, drive rollers 160, and transfer drivers 164. The foot rest bracket 157 is pivotably coupled to the frame 158 and pivotable about a horizontal axis 155. The foot rest 156 has multiple patterns of anti-slip surface treatment 168 on the surface of the foot rest 156. The foot rest 156 extends forwardly from the foot rest bracket 157. The extension of the foot rest 156 from foot rest bracket 157 and the relative angle of the foot rest 156 to the frame 158 are adjustable to a plurality of positions and the foot rest 156 may be locked in position. The mounting of the foot rest 156 and the foot rest bracket 157 correspond to the location of the feet of a person seating in the seat 108 of the personal mobility device 100.

Figure 5:
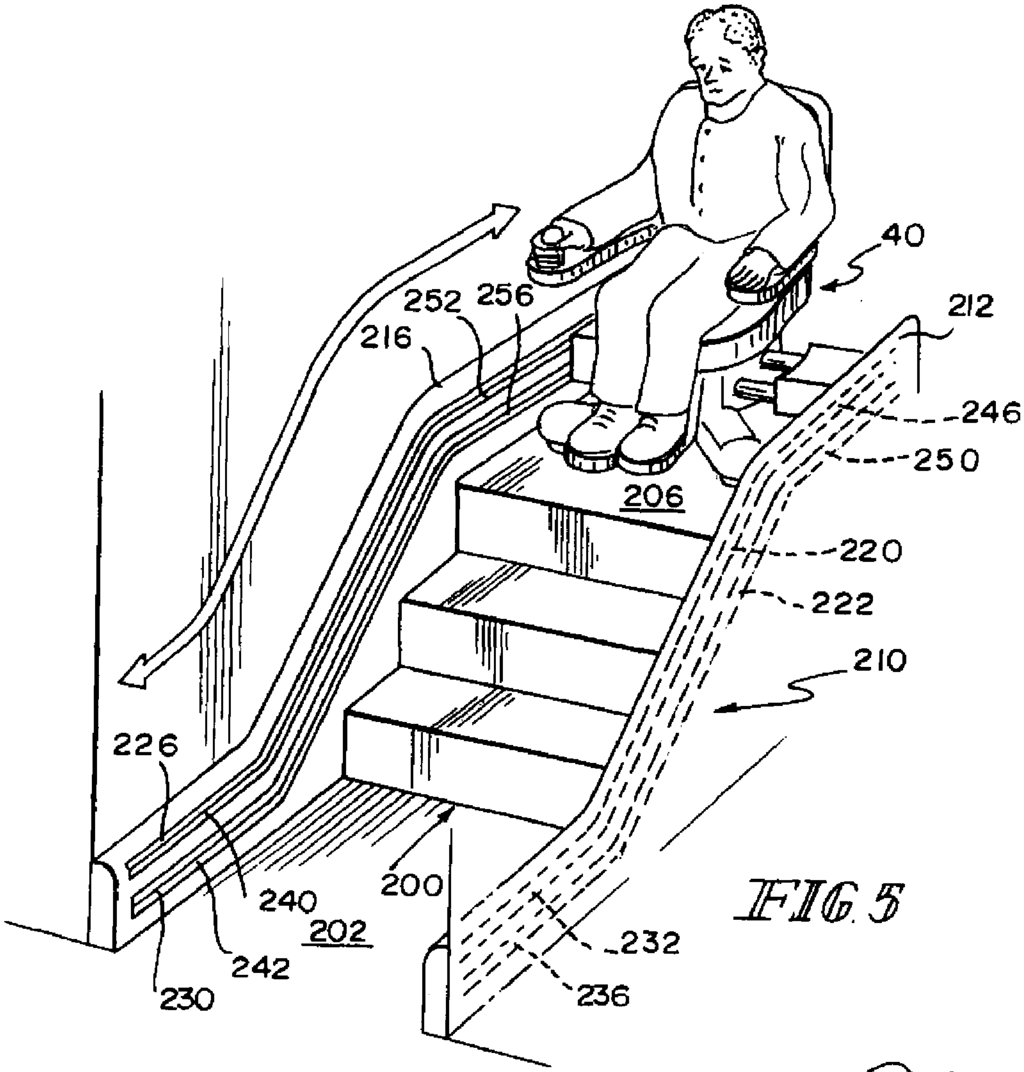
FIG. 5 is a perspective view of a set of stairs having a transfer guide system compatible with the personal mobility device in FIG. 2.
Figure 6:
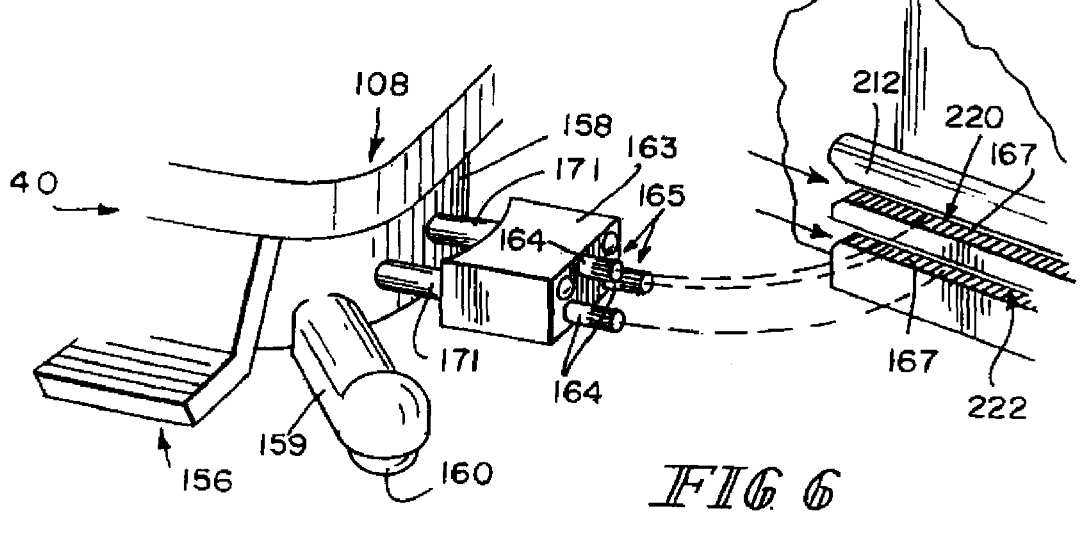
FIG. 6 is a perspective view of a set of transfer drivers of a personal mobility device engaging into the tracks of the transfer guide system of FIG. 5.

The transfer drivers 164 extend laterally from the personal mobility device 100 and engage a guide adjacent a stairway as described more fully in the illustrative embodiment of FIGS. 5 and 6.

The legs 159 extend outwardly from the frame 158. The legs are adjustably spaced around the bottom perimeter of the frame 158. The drive system responds to any change in forces experienced by the legs 159 and alters the spacing of the legs 159 around the perimeter of the frame 158 to compensate for changes in the horizontal location of the center of gravity of the person occupying the personal mobility device 100. The adjustment is accomplished by an active control system (not shown) which receives inputs from sensors (not shown) coupled to the legs 158. These sensors provide independent force readings responsive to the force being supported by a leg. These readings are utilized by a controller (not shown) to resolve the various forces in the legs 158 to determine the horizontal location of the resulting downward force. Once this location is known, the legs 158 are moved to compensate and provide support for the load on the personal mobility device 100.

Figure 31:
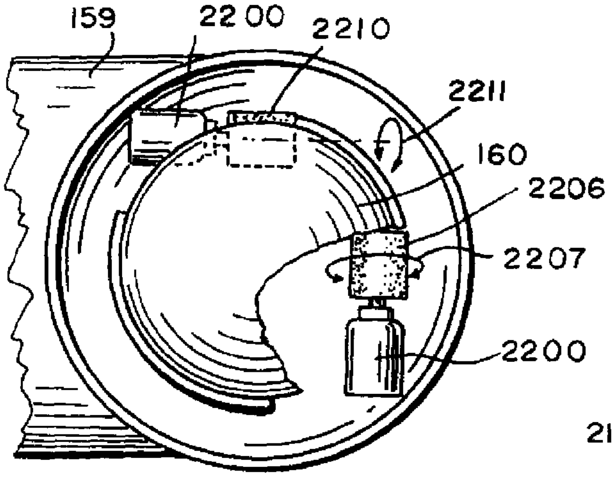
FIG. 31 is a bottom view of a drive ball of the personal mobility device of FIG. 2.

Drive rollers 160 are located in legs 159 and provide locomotion of the personal mobility device 100. Referring to FIG. 31, the drive rollers 160 are driven by two drive wheels 2206, 2210 in each leg 159 and are oriented perpendicular to the surface where the personal mobility device 100 is placed. The two drive wheels 2206, 2210 in each leg 159 are each driven independently by a motor 2200 in a rotational direction represented by arrows 2207 and 2211 respectively. The motors 2200 receive an input from a controller (not shown) which processes a signal from the control input 124 and provides the appropriate driving signal to the drive wheels 2206, 2210. The drive wheels 2206, 2210 drive at independent speeds and directions to achieve a desired direction and speed of the drive rollers 160. By operating each of the drive rollers 160 in each of the legs 159 in this way, the speed and direction of the personal mobility device 100 can be controlled. Because drive rollers 160 may be driven in a plurality of directions, personal mobility device 100 may be driven in any direction without the need for turning. This provides the ability for a person to navigate in any direction from any position. In some embodiments, only one drive wheel 160 may be powered and the remainder may be un-powered and simply follow the motion of personal mobility device 100.

Figure 3:
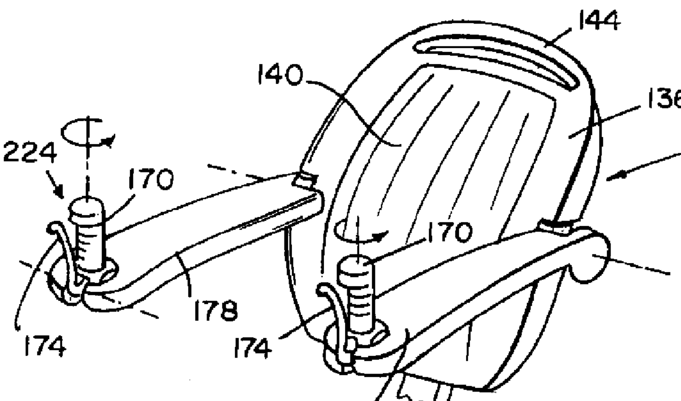
FIG. 3 is a perspective view of an embodiment of a control input on the personal mobility device of FIG. 2.

Referring now to FIG. 3, a control input 224 of a personal mobility device 100 is located on the end of the armrests 178 and 182. The control input 124 includes a turn-style joystick 170 and a brake grip 174 pivotably coupled in a horizontal axis to the armrests 178 and 182. The turning and pushing of the turn-style joystick 170 by the occupant of the personal mobility device 100 provide the direction and speed of the travel of the personal mobility device 100. The squeezing of the brake grip 174 decelerates the personal mobility device 100. Control input 224 is provided to assist a person lacking fine motor skills the ability to control the operation of personal mobility device 100 to a fine degree through gross movements of the control input 224 joystick 170 and thereby improve mobility.

Figure 4:
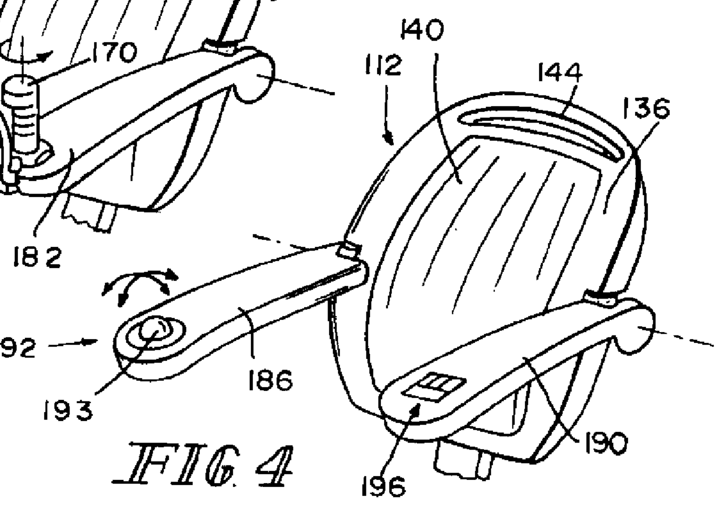
FIG. 4 is a perspective view of yet another embodiment of a control input of the personal mobility device of FIG. 2.

Referring now to FIG. 4, another embodiment of a control input 192 of a personal mobility device 100 is a ball-style multi-directional control input 193 located on the end of the armrest 186. The turn of the ball 193 provides the direction of the personal mobility device 100. Armrest 190 has push-button style control input 196 located on the end of the armrest 190. The buttons of the control input 196 provides start, stop, acceleration, and deceleration commands to the personal mobility device 100. Control input 192 provides an alternative input approach to the operation of personal mobility device 100.

Figure 27:
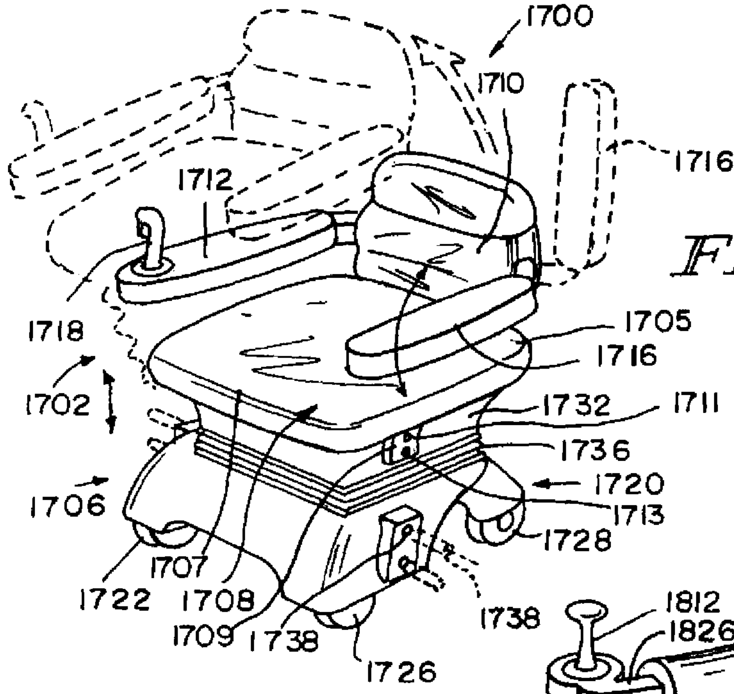
FIG. 27 is a perspective view of another embodiment of a personal mobility device.

FIG. 27 shows another embodiment of a personal mobility device 1700. The personal mobility device 1700 has an upper portion 1702 and a lower portion 1706. The upper portion 1702 includes a seat 1708, a backrest 1710, two armrests 1712, 1716, and a joystick 1718. The seat 1708, coupled to the base 1720, is contoured, padded, and covered in fabric. The backrest 1710 is coupled to the seat 1702 and is configured to be adjusted such that the angle between the seat 1702 surface and the backrest 1710 is adjustable according to the preference of a person supported on the personal mobility device 1700. The armrests 1712, 1716 are pivotably coupled to the backrest 1710 and extend forwardly from the backrest 1710. The armrests 1712, 1716 are moveable between a use position as shown in solid in FIG. 27 and an out-of-the-way position wherein the armrests 1712, 1716 extend generally vertically as armrest 1712 is shown in phantom in FIG. 27. In the out-of-the-way position, the armrests 1712, 1716 are positioned so that person supported on the personal mobility device 1700 may egress out the side of the personal mobility device 1700. The joystick 1718 is mounted to armrest 1712 and is electrically coupled to a controller (not shown) in base 1720 and controls the speed and direction of the personal mobility device 1700. The speed of personal mobility device 1700 is proportional to the magnitude of displacement of the joystick 1718.

The lower portion 1706 has the base 1720, first and second drive wheels 1722, 1726, two trailing casters 1728, a lift mechanism 1732, and transfer drivers 164. A first motor (not shown) drives wheel 1722 and a second motor (not shown) drives wheel 1726. Drive wheels 1722 and 1726 operate independently so that the personal mobility device 1700 can achieve a zero turn radius and reverse direction. The base 1720 is formed to receive trailing casters 1728 which are located rearwardly from the drive wheels 1722, 1726. The trailing casters 1728 are un-powered and free to swivel on the wheel stems (not shown). The drive wheels 1722, 1726 and the trailing casters 1728 provide four points of rolling contact with the floor.

The lift mechanism 1732 includes a drive motor (not shown), a lift linkage (not shown), and a cover 1736. The motor is electrically connected to a battery and the controller. A control panel 1709 includes a raise activation button 1711 and a lower activation button 1713 which are configured to control the height of the personal mobility device 1700. A user raises the seat 1708 of personal mobility device 1700 by activating button 1711 and lowers the seat 1708 by activating a button 1713. The height adjustment of personal mobility device 1700 is also operable to serve as a lift assist mechanism to assist a person to egress from the personal mobility device 1700 by lifting their body while their feet are stationary on the floor. The lift mechanism 1732 is configured so that as the seat 1708 is lifted to its highest position, the back 1705 of seat 1708 is elevated more than the front 1707 of the seat 1708 during a final portion of the articulation to thereby ease the exit and entry of the seat 1708 by a person. The elevated position of the personal mobility device 1700 is shown in phantom in FIG. 27.

Figure 28:
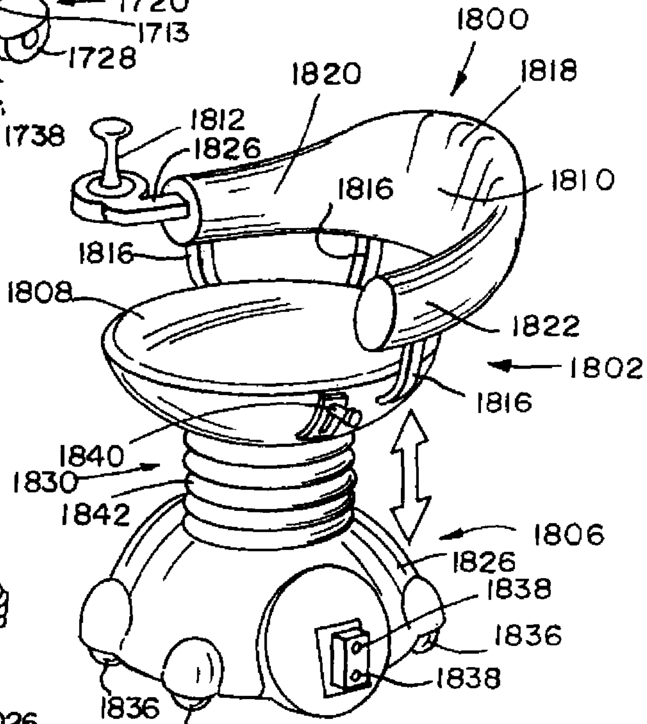
FIG. 28 is a perspective view of yet another embodiment of a personal mobility device.

Yet another embodiment of a personal mobility device 1800, shown in FIG. 28, has an upper portion 1802 and a lower portion 1806. The upper portion 1802 has a seat 1808, an integrated back and armrest 1810, and a joystick 1812. The seat 1808 is round, cushioned and covered in fabric. The integrated back and armrest 1810 is coupled to the seat 1808 through multiple brackets 1816. The integrated back and armrest 1810 is padded and covered with fabric. The integrated back and armrest 1810 is located on the back of the personal mobility device 1800 and follows the circular shape of the seat 1808, having a larger height in the backmost portion 1818 of the integrated back and armrest 1810 and a smaller height in the armrest portions 1820, 1822. The brackets 1816 extend upwardly from the seat 586, connecting the integrated back and armrest 1810 to the seat 1808. The joystick 1812 is coupled to the integrated back and armrest 1080 through a bracket 1826 and operates to control movement of the personal mobility device 1800.

The lower portion 1806 has a base 1828, a lift 1830, a drive motor (not shown) and multiple stability casters 1836. The base 1828 is generally hemispherical in shape with an open bottom. The drive motor (not shown) is coupled to the base 1828 and is electrically connected to a controller (not shown) and a battery (not shown). The controller and the battery are both coupled to the base 1828 and are hidden from view within the base 1828. The stability casters 1836 are coupled to the perimeter of the bottom edge of the base 1828. The stability casters 1836 are free to swivel about their stem and free to rotate about their axes. Lower portion 1806 also includes transfer drivers 164 coupled to base 1828 in a manner similar to that described above in the discussion of other embodiments of personal mobility devices 40, 100, and 1700.

The lift 1830 is coupled to the base 1828 and the seat 1808 is coupled to the top of the lift 1830. Lift 1830 includes a drive motor (not shown), a lift mechanism (not shown), a height adjuster 1840 and a cover 1842. The motor is electrically connected to the battery, the controller, and the height adjuster 1840. The height adjuster 1840 is configured to control the height of the personal mobility device 1800.

Figure 29:
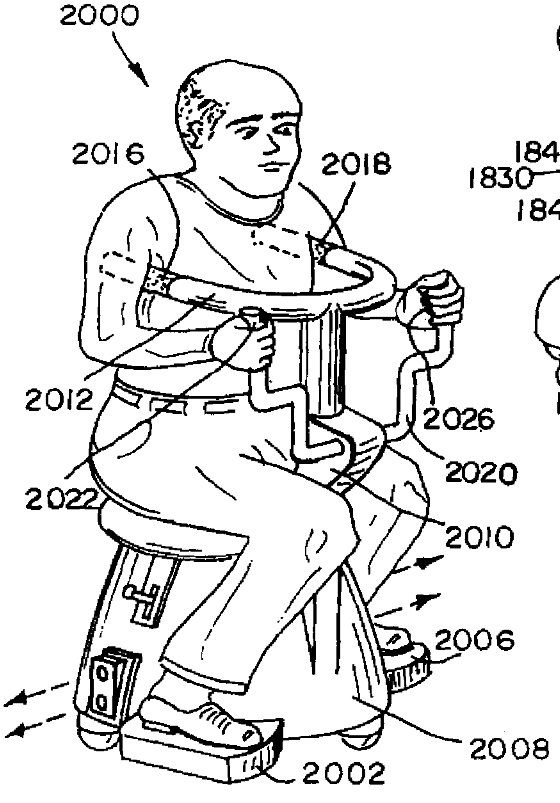
FIG. 29 is a perspective view of still yet another embodiment of a personal mobility device.

FIG. 29 shows still yet another embodiment of a personal mobility device 2000, the back is omitted to facilitate rearward egress of the user from device onto an adjacent device such as a toilet, chair, or bed. Two foot rests 2002, 2006 are coupled to the base 2008. A support 2010 extends generally vertically from the base 2008. A unitary upper body support 2012 is coupled to the support 2010. The upper body support 2012 is a tubular member formed in a semicircular shape with the opening facing away from the support 2012. The upper body support 2012 has soft padded material 2016, 2018 coupled to the both ends of the upper body support 2012 to provide comfortable surface.

A tubular handlebar 2020 is coupled to the base 2008. Attached to the two ends of handlebar 2020 are a pair of controls 2022, 2026, that control the speed and direction of the personal mobility device 2000.

Figure 30:
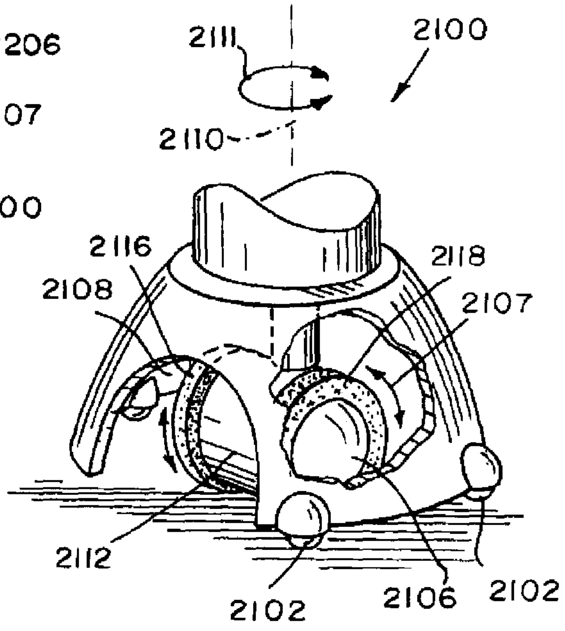
FIG. 30 is a perspective view of a base of a personal mobility device, the base having a dual drive wheel driving system.

FIG. 30 shows an illustrative embodiment of a lower portion 2100 of a personal mobility device similar to the lower portion 1806 of personal mobility device 1800. Lower portion includes a housing 2108, stability casters 2102 coupled to the housing 2108, and a drive 2106 coupled to housing 2108. The center of the drive wheel 2106 is positioned along a vertical axis 2110 that passes through the center of the seat (not shown) and lower portion 2100. The drive 2106 has a stationary center portion 2112 and two drive wheels 2116, 2118 on opposite sides of the stationary center portion 2112. Drive wheels 2116 and 2118 are free to move independently of one another and can rotate in the same direction or in opposite directions. They can also rotate at different speeds. Stationary center portion 2112 houses motors (not shown) which drive the drive wheels 2116 and 2118. Stationary center portion 2112 is coupled to a controller and a battery (not shown) and provides a path for the electrical connections from the controller and battery to the motors.

The stability casters 2102 are coupled to lower portion 2100 and position about the perimeter of the bottom of the housing 2108. Stability casters 2102 are free to swivel about their stem (not shown) and are free to rotate and provide multiple points of contact with the floor to provide additional stability for a personal mobility device.

A person using personal mobility device 40, 100 has the ability to utilize the personal mobility device 40, 100 to move throughout a single level of the home 10. However, movement between floors is limited. The exemplary embodiment of the personal mobility device 40, 100 is configured to assist in the transfer of the person occupying the device 40, 100 from a first elevation to a second elevation.

Referring to FIG. 5, a system of stairs 200 transverse between a floor level 202 and an elevated level 206. The stairs 200 are equipped with a transfer guide system 210 which is configured to work with the personal mobility device 40 of the illustrative embodiment of FIG. 5 to permit a person to use the personal mobility device 40 to transfer over the elevation of the stairs. The transfer drivers 164 of the personal mobility device 40 extend from the frame 158 of the personal mobility device 40 and engage the transfer guide system 210. The transfer guide system 210 has two guides 212 and 216 one located on each side of the stair. The guide 212 has two tracks 220 and 222. The two tracks 220 and 222 follow the shape of the guide 212 and follow a generally parallel path along the guide 212. Likewise, guide 216 has two tracks 226 and 230. The two tracks 226 and 230 follow the shape of the guide 216 and follow a generally parallel path along the guide 216. A person utilizing the personal mobility device 100 approaches the transfer guide system 210 and extends the transfer drivers 164 on each side of the personal mobility device 40. The transfer drivers 164 engage the tracks 220, 222, 226, and 230 and begin rotating within the tracks 220, 222, 226, and 230 (shown in FIG. 6) to move the personal mobility device 100 along the transfer guide system 210. In the illustrative embodiment of FIGS. 5 and 6 the transfer drivers 164 have external teeth 165 which intermesh with internal teeth 167 in the tracks 220, 222, 226, and 230 such that there can be no slipping during the transition between level 202 and level 206. It should be understood that there are any of a number of approaches to engage transfer drivers 164 to tracks 220, 222, 226, and 230 to prevent slippage therebetween. The transfer drivers 164 are driven by a motor 163 which rotates the transfer drivers 164 to move the personal mobility device 40 along the transfer guide system 210. In the illustrative embodiment of FIG. 2, a motor 161 is contained within the frame 158 of the personal mobility device 100 to power transfer drivers 164.

Personal mobility device 100 of FIG. 2 extends only the transfer drivers 164. In the embodiment of FIGS. 5 and 6, personal mobility device 40 includes extension rods 171 which extend motor 163 and transfer drivers 164 as a complete unit. Additionally, personal mobility device 40 has a single transfer driver 164 in an upper position and two transfer drivers 164 in a lower position. The two lower transfer drivers 164 work together to assist in stabilizing the personal mobility device 40 during transfer. All three of the transfer drivers 164 in the illustrative embodiment of FIGS. 5 and 6 are coupled to rotate together in time and thereby maintain the orientation of the personal mobility device 40 during transfer.

The transfer drivers 164 are configured such that they cannot be retracted from the tracks 220, 222, 226 and 230 while the transfer drivers 164 have not passed the safety point 232 on track 220, safety point 236 on track 222, safety point 240 on track 226, and safety point 242 on track 230, when the personal mobility device 100 moves from the elevated level 206 to the floor level 202. Similarly, the transfer drivers 164 cannot be retracted from the tracks 220, 222, 226 and 230 while the transfer drivers 164 have not passed the safety point 246 on track 220, safety point 250 on track 222, safety point 252 on track 226, and safety point 256 on track 230, when the personal mobility device 100 moves from the floor level 202 to the elevated level 206. This provides a safety feature so that a person using the device 100 cannot accidentally retract the transfer drivers 164 and cause the person to fall.

Figure 13:
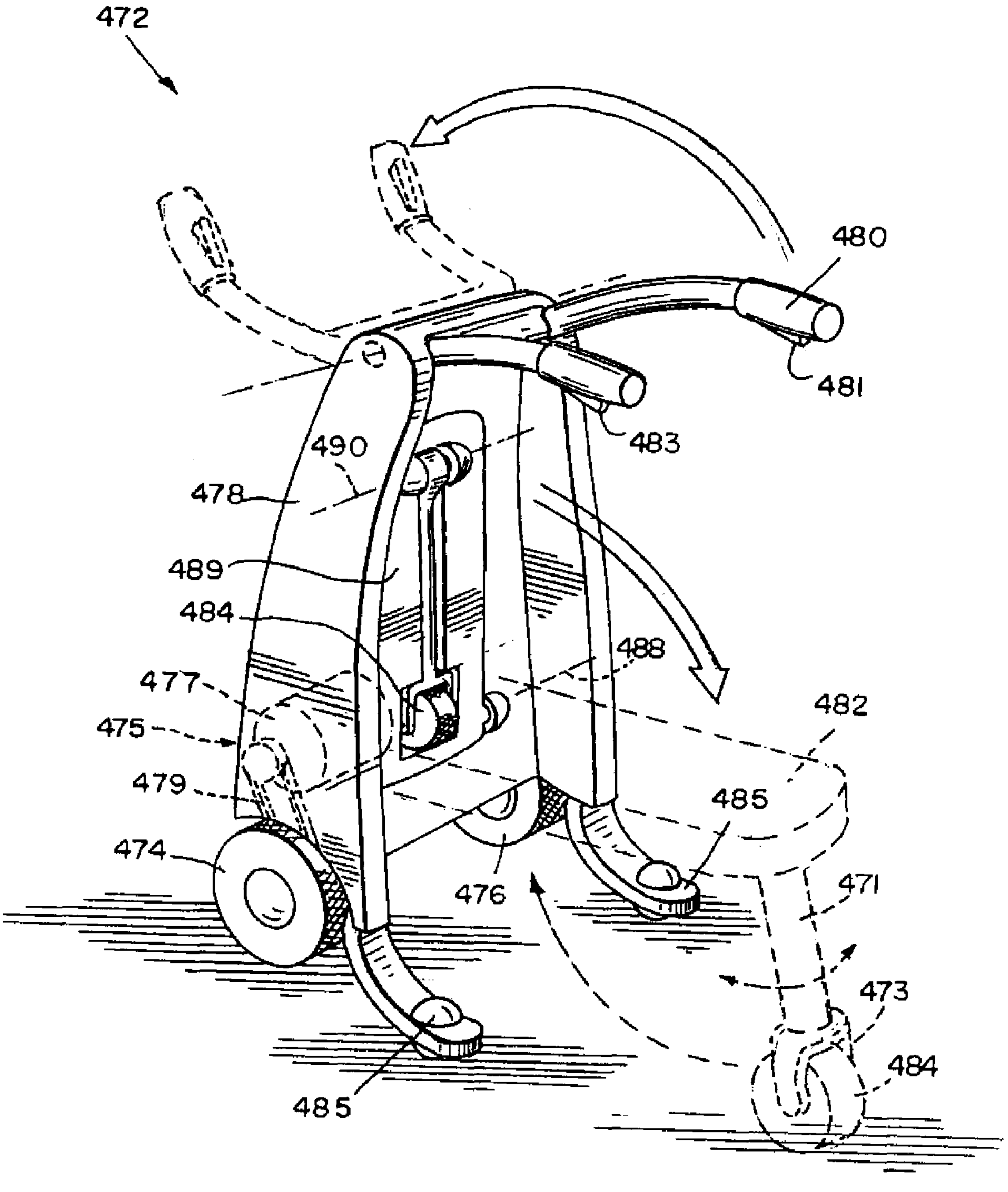
FIG. 13 is a perspective view of a powered walker, the walker having a fold down seat.

In some cases, a person may have a higher level of mobility and does not need a full-time personal mobility device such as the personal mobility devices 40 or 100. In some instances, a mobility assist device may be more appropriate and provide the person with a higher sense of independence. For example, a powered walker 472 having a drive system 475, drive wheels 474, 476, a frame 478, a control handle 480, a seat 482, and a stability wheel 484 is shown in FIG. 13. The powered walker 472 is appropriate for navigating around the home 10, but is configured to provide a higher level of assistance if a person becomes fatigued. A person uses the walker 472 by gripping the control handle 480 and walking along behind the powered walker 472. The drive system 475 comprises a motor 477 and a drive train 479 driving drive wheels 474 and 476. The control handle 480 includes a speed control input device 481 and a brake 483 which allows the person 486 to control the speed of the powered walker 472.

If the person 486 becomes fatigued, the powered walker 472 is convertible to allow the person to operate the powered walker 472 as a personal mobility device. Seat 482 rotates about a substantially horizontal axis 488 between an out-of-the-way position shown in solid and a use position as shown in phantom. The stability wheel 484 is stowed in a cavity inside the frame 478 when the stability wheel 484 and the seat 482 are in the out-of-the-way position as shown in solid in FIG. 13. The stability wheel 484 pivots about a substantially horizontal axis 490 and moves into a use position simultaneously with the seat 482 moving to the use position. The stability wheel 484 is a caster and locks relative to the frame 478 when the powered walker is converted to a personal mobility device. The stability wheel 484 pivots relative to a post 471 when powered walker 472 is maneuvered. The walker also includes two stabilizers 485, 487 which slide along the ground when the powered walker 472 is being used either in the walker configuration or as a personal mobility device. The stabilizers 485, 487 serve as foot rests when the powered walker 472 is being used as a personal mobility device. The control handle 480 rotates between a use position in a walker configuration as shown in solid in FIG. 13 and a use position in a personal mobility device configuration as shown in phantom.

An additional issue associated with mobility and independence is the need for a person to transfer from the personal mobility device 40, 100 to other furniture within the home. As described above, the personal mobility device 100 has pivotable armrests 116, 120 which move to an out-of-the-way position to facilitate a lateral transfer onto and off of the personal mobility device 100. This approach facilitates the lateral transfer to other furniture in the home.

Figure 7:
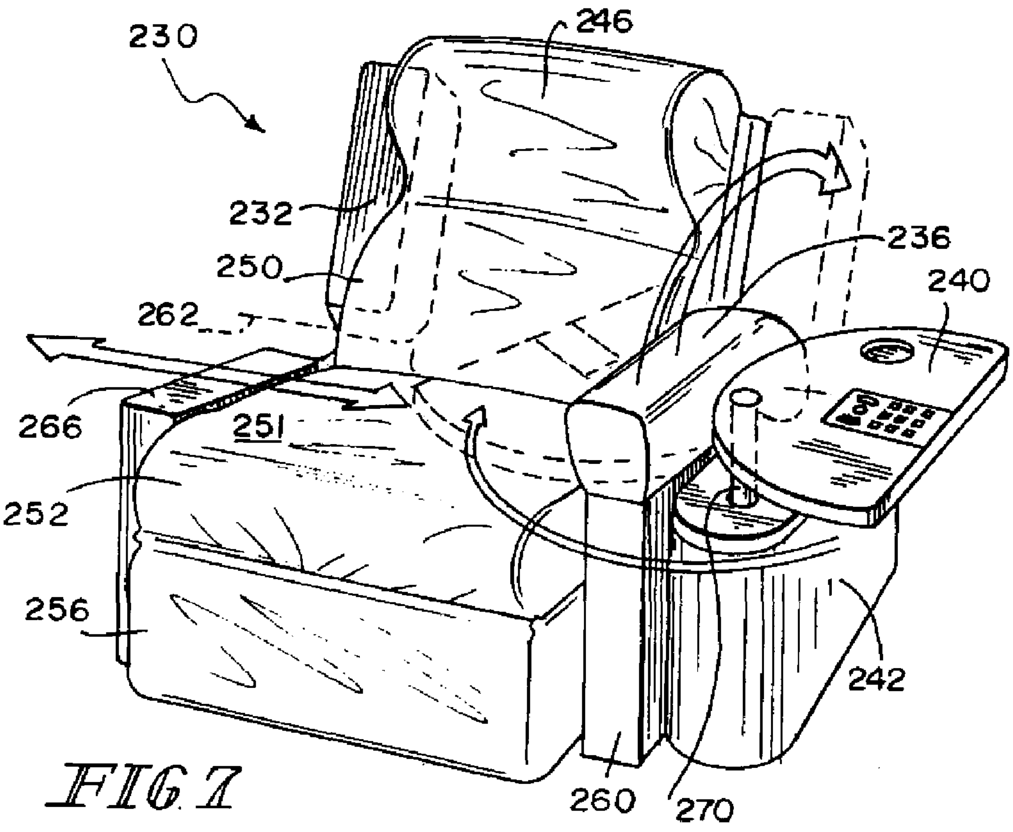
FIG. 7 is a perspective view of a reclining chair having a fold-up arms, a pivoting tray and a temperature-controlled storage unit on one side of the reclining chair.

Referring to FIG. 7, a reclining chair 230 has fold-up arms 232, 236 to facilitate lateral transfer. Additionally, the chair 230 includes a pivotable tray 240, and a temperature-controlled storage unit 242. In addition to arms 232, 236, chair 230 comprises a head section 246, a back section 250, a seat section 252, a leg section 256, and a base 260. The head section 246, back section 250, and leg section 256 articulate from a chair position as shown in FIG. 7 to a reclining position shown in FIG. 8. The arms 232 and 236 are pivotably coupled to the base 260 and pivot about a horizontal axis 262. The arms 232, 236 pivot between a use position as arm 236 is shown in solid and an out-of-the-way position as arm 232 is shown and arm 236 is shown in phantom. Pivoting of arms 232 and 236 exposes a flat-surfaced armrest supporting section 266. The top of the armrest supporting section 266 is generally flush and coplanar with an upward facing surface 251 of the seat section 252 to facilitate lateral transfer of a person between the reclining chair 230 and the personal mobility device 40, 100 or other apparatus. Arms 232, 236 are raised and lowered manually in some embodiments and are powered up and down in other embodiments.

The pivotable tray 242 is pivotably coupled to a vertical support rod 270 which is couple to the top of the temperature controlled storage unit 242. The tray 242 can pivot over arm 236 into a use position as shown in phantom or out-of-the-way position as shown in solid in FIG. 7. The temperature controlled storage unit 242 is attached to the one side of the base 260 and provides a suitable storage area for cooled or heated food and beverages thus reducing the need for a person occupying the chair 230 get out of the chair 230.

Figure 8:
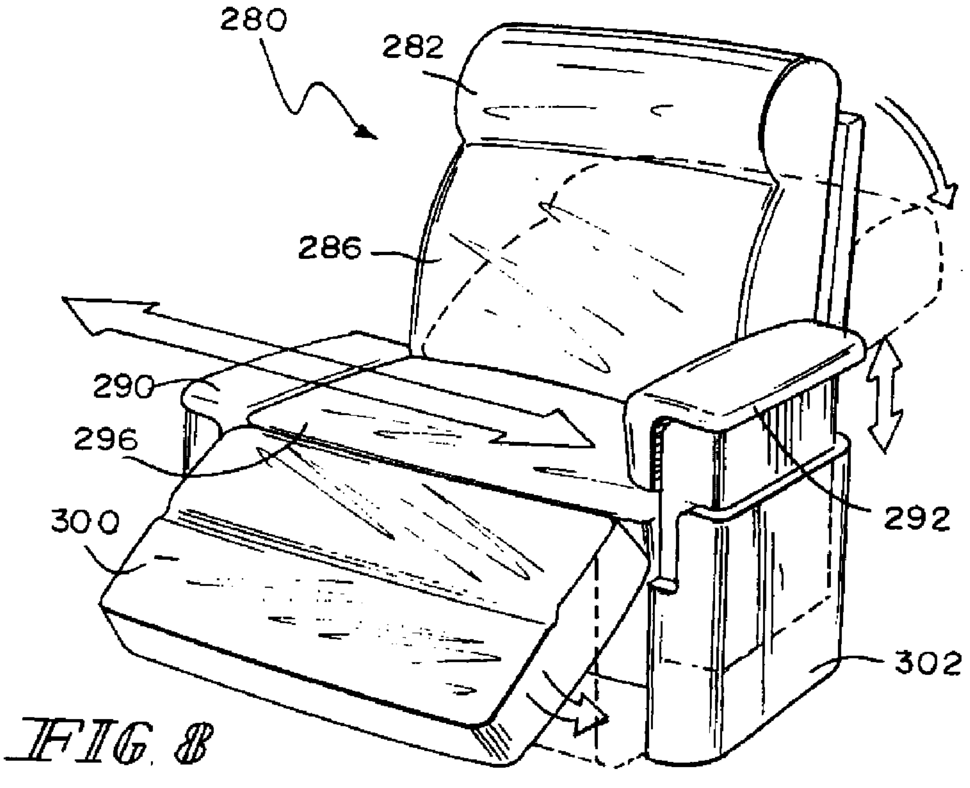
FIG. 8 is a perspective view of another embodiment of a chair.

FIG. 8 shows another embodiment of a chair 280 which includes a head section 282, a back section 286, arms 290, 292, a seat section 296, a leg section, 300, and a base 302. The head section 282, back section 286 and the leg section 300 articulate from a chair position shown in solid to a reclined position wherein the head section 282, the back section 286, the seat section 296, the leg section 300 form a substantially horizontal surface shown partially in phantom. The head section 282, back section 286, and the leg section 300 each articulate independently, permitting the chair bed 280 to be adjusted to a plurality of configurations between the chair position and the substantially horizontal position. Each of the arms 290 and 292 are adjustable between a lowered position, wherein the top of the arms 290 and 292 are substantially coplanar to the horizontal surface of the seat section 296, and a raised position (see arm 292). When the arms 290 and 292 are in lowered position, they are out-of-the-way to permit a direct surface to surface transfer between chair 280 and another device such as a personal mobility device 100 as shown in FIG. 2. Arms 290 and 292 are raised or lowered manually in some embodiments and are powered up and down in other embodiments.

Figure 32:
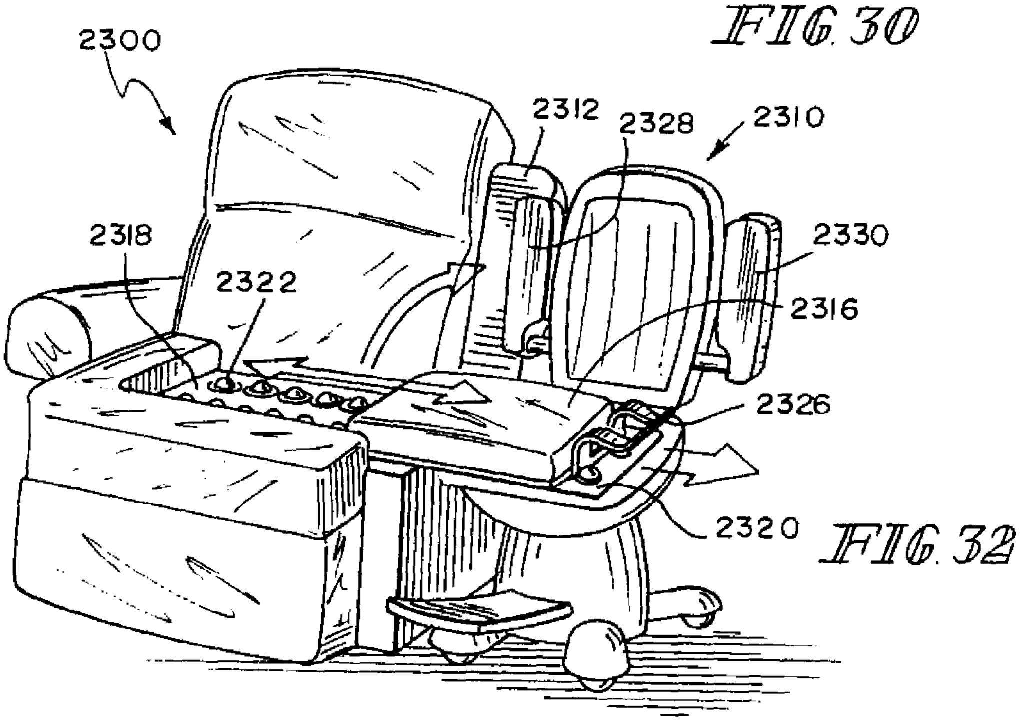
FIG. 32 is a perspective view of the personal mobility device of FIG. 2 adjacent a chair with the seat portion being transferable between the chair and the personal mobility device.

FIG. 32 is a perspective view of a reclining chair 2300 with a fold-up arm 2312, the chair 2300 positioned next to a personal mobility device 2310 with the seat 2316 of the chair 2300 being transferred to the personal mobility device 2310. The fold-up arm 2312 of the reclining chair 2300 is pivoted up to a vertical out-of-the-way position allowing the seat 2316 of the personal mobility device 2300 to be moved from the top of a surface 2318 of the chair 2300 to the top of a surface 2320 of the personal mobility device 2310. The bottom of the seat 2316 is a rigid material which supports the seat 2316 as it moves across rollers 2322, which are mounted to the surface 2318 of the chair 2300 and surface 2320 of personal mobility device 2310. A strap 2326 is attached to the seat 2316 so that a helper helping a person seated on the seat 2316 can pull on the strap 2326 to assist in transferring the person from the chair 2300 to the personal mobility device 2310. The rollers 2322 are evenly spaced on the surface 2318 of the reclining chair 2300 and provide a uniform contract surface to the bottom surface of the seat 2316. The personal mobility device 2310 has pivotable arms 2328, 2330 which can be pivoted to an out-of-the-way position to facilitate the transfer between the reclining chair 2300 and the personal mobility device 2310.

Figure 9:
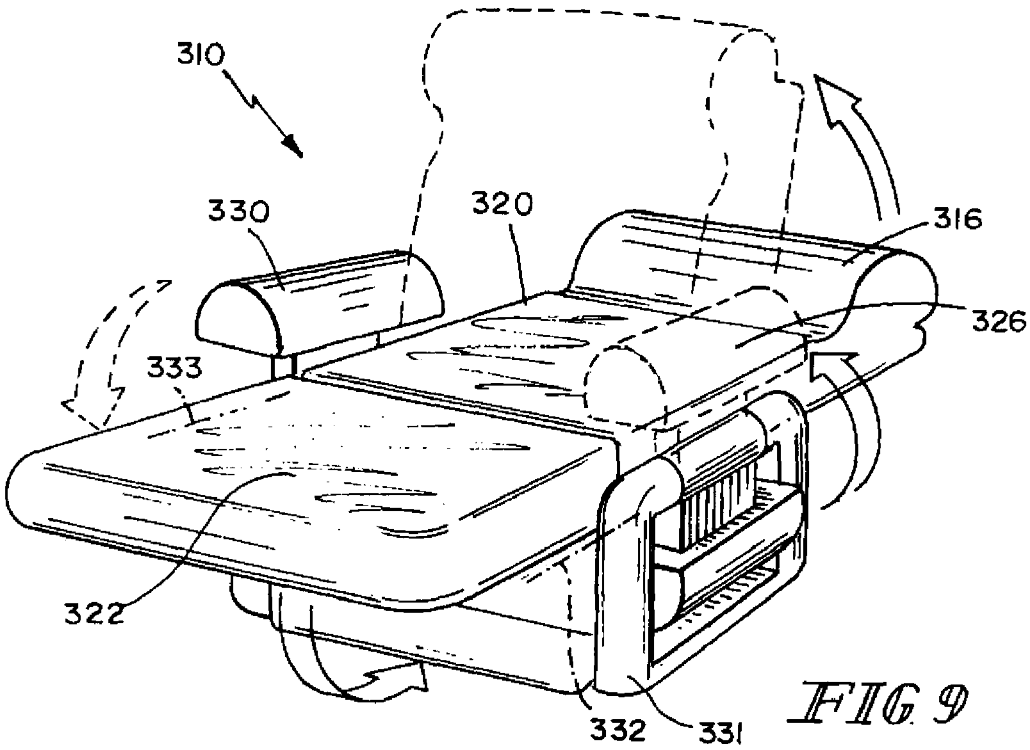
FIG. 9 is a perspective view of another embodiment of a chair, the chair having arms that rotate downwardly to a storage position and the chair in a reclining position.

Referring now to FIG. 9, another embodiment of a chair 310 includes head and back rest 316, a seat section 320, a foot section 322, and articulating armrests 326, 330. Chair 310 articulates from a chair position (not shown) to a substantially horizontal position. The foot section 322 and the head and back rest 316 each articulate independently and are capable of achieving any number of positions between the chair position and the horizontal position of FIG. 9. Armrests 326, 330, articulate about a substantially horizontal axis 332, 333 between a use position shown in FIG. 9 and a stowed position as arm 326 is shown in solid in FIG. 9. In the stowed position, arms 326, 330 are received within a frame 331 of the chair bed 310.

Figure 10:
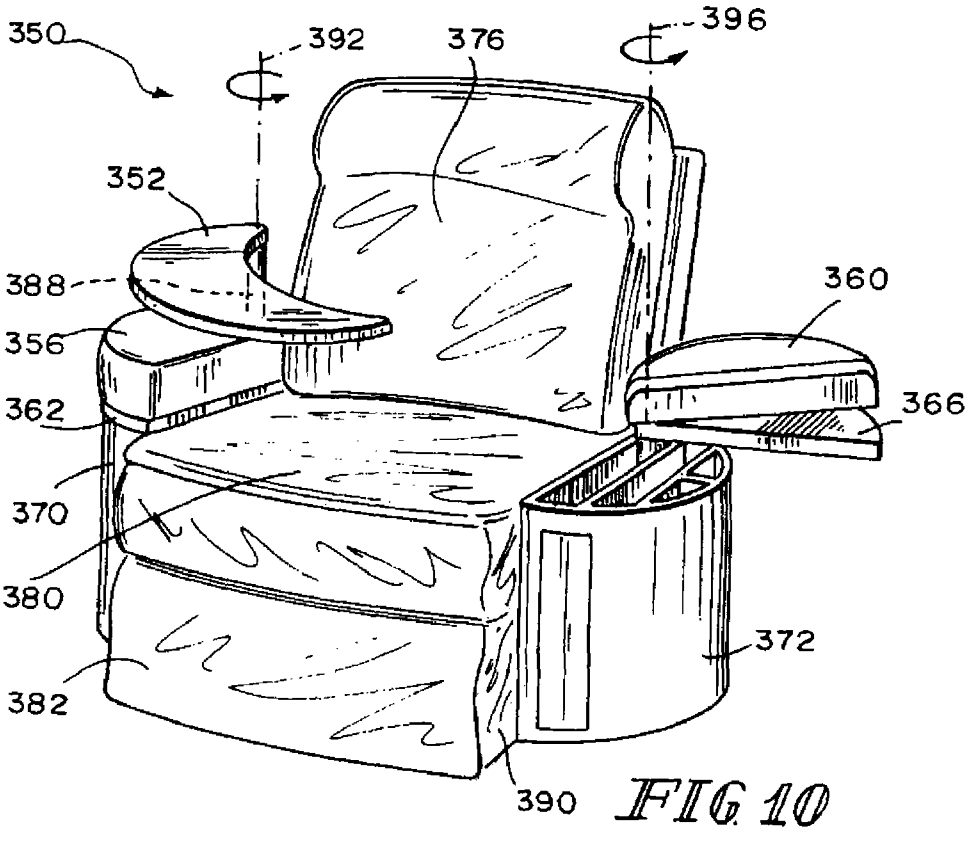
FIG. 10 is a perspective view of another embodiment of a chair, the chair having transferring plates, a pivoting tray on one side of the chair and a temperature controlled storage unit beneath an armrest on another side of the chair.

Another embodiment of a chair 350 having a pivotable tray 352, armrests 356, 360, transfer plates 362, 366, and temperature controlled storage units 370, 372 is shown in FIG. 10. The chair 350 reclines having a back rest 376, a seat section 380, and a leg section 382. The pivotable tray 352 is pivotably coupled to a support rod 388 that is coupled to the frame (not shown) of the base 390 of the chair 350. Illustratively, tray 352 is crescent shaped so as to conform to the torso of a person seated in the chair 350 when pivoted into a use position as shown in FIG. 10. The tray 352 horizontally pivots out-of-the-way of the person when not in use. The armrests 356, 360 are pivotably coupled to the storage units 370, 372 and are pivotable in vertical axes 392 for armrest 356 and 396 for arm 360, between a use position adjacent to the seat section (as armrest 356 appears in FIG. 10) and an out-of-the-way position (as armrest 360 appears in FIG. 10). Transfer plates 362, 366 are also pivotably coupled in vertical axes 392 and 396 to the storage units 370, 372. When armrests 356, 360 are in the out-of-the-way position, the upper surfaces of transfer plates 362, 366 are substantially coplanar with the upper surface of seat section 380. Transfer plates 362, 366 are solid and provide a surface suitable for a person to slide across to egress the chair 350 and enter a transport device such as a personal mobility device 40, 100. The storage units 370, 372 are temperature controlled and provide a suitable storage area for cooled or heated food and beverages. In some embodiments, one or both of the storage units 370, 372 may not be temperature controlled and may be used for storage of non-food items.

While chairs 230, 280, 310 and 350 provide amenities to facilitate a long-term occupation of the chair 230, 280, 310 or 350, at times it will be necessary or preferable for a person to spend an extended period of time in bed due to illness or injury. These extended periods of convalescence tend to reduce the perception of independence. Addressing the extended periods of convalescence through comfort devices assists in providing a sense of independence by eliminating the need for convalescence in a clinical setting.

Figure 11:
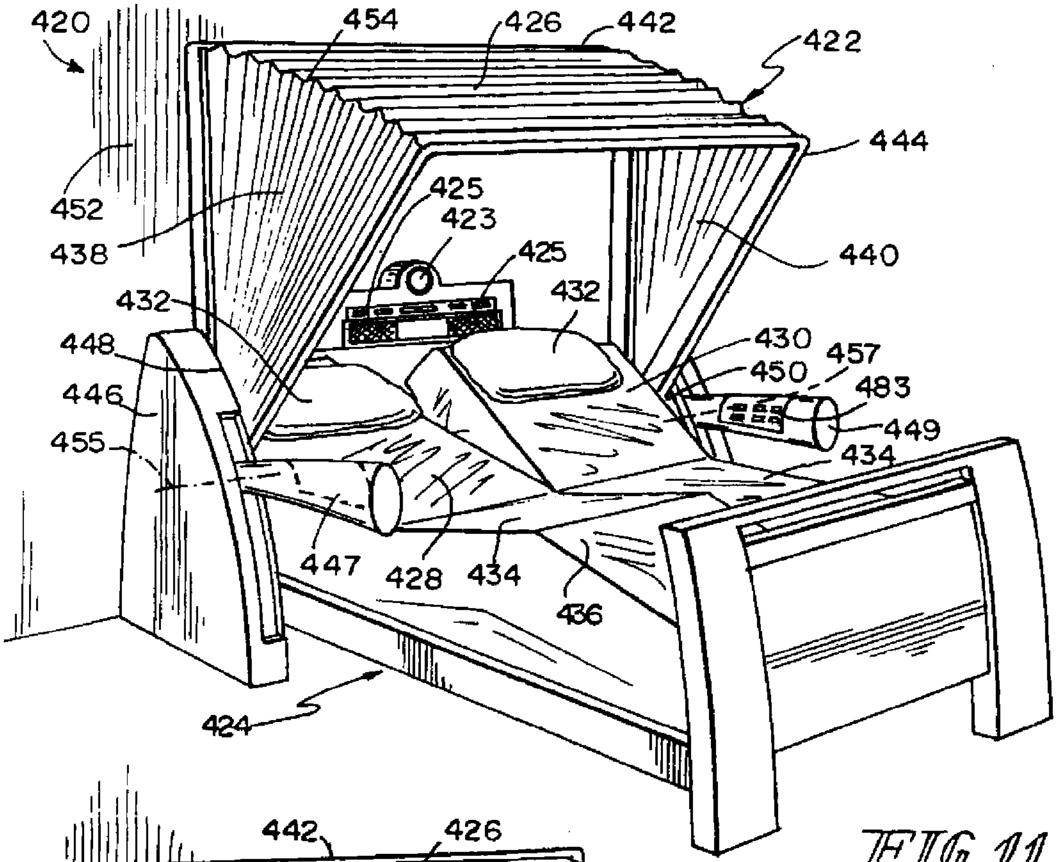
FIG. 11 is a perspective view of a two-section bed having independent adjustable bed portions and a powered canopy with the canopy in an open position.

A personal relaxation system 420 is shown in FIG. 11. The personal relaxation system 420 includes a power canopy 422, a bed 424, a temperature control unit (not shown), an air purifier (not shown), a video projection device 423, speakers 425, and an aromatherapy device (not shown). The power canopy 422 articulates from an out-of-the-way position shown in FIG. 11 to a use position shown in FIG. 12 wherein the canopy 422 encloses the bed 424 and provides a relaxation environment within the confines of the canopy 422. In the use position, the underside of the top 426 of the power canopy 422 is a surface suitable for receiving the projection of video images from the video projection device 423. The canopy 422 provides a substantial reduction of extraneous sound or noise and an enclosure for aromatherapy or other therapies. The speakers provide a source of sound within the canopy that may operate in conjunction with, or independently from, the video projection device 423. The temperature control unit, air purifier, and aromatherapy devices work in conjunction with each other to provide the occupant of the personal relaxation system 420 with appropriate environmental conditions to achieve a relaxed state and thereby assist in convalescence. The operations of the various devices may be programmable to provide a specific relaxation profile for a particular time or particular occupant of the personal relaxation system 420. As shown in the illustrative embodiment of FIGS. 11 and 12, the personal relaxation system 420 may take the form of a typical bed in the bedroom 24 and operate as both a bed for sleeping and incorporate the features of personal relaxation system 420.

Figure 12:
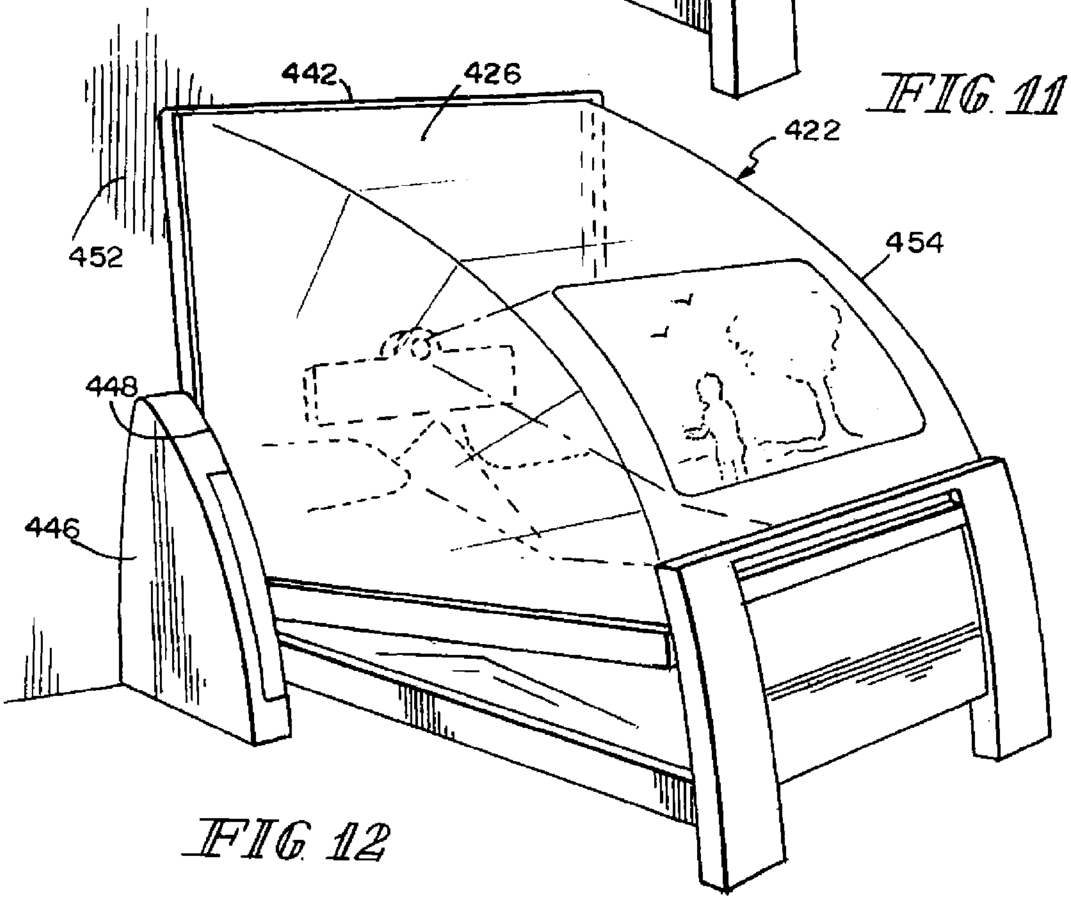
FIG. 12 is a perspective view of the two-section bed of FIG. 11 with the canopy in a closed position.

The powered canopy 422 has a top 426, sides 438, 440, a stationary frame 442, a moving frame 444, a power unit 446, and guides 448, 450. The top 426 and sides 438, 440 are flexible and foldable. Stationary frame 442 is coupled to the wall 452 at the head end of the bed 424. The end of the top 426 and the end of sides 438, 440 are attached to the stationary frame 442. Moving frame 444 has telescoping members 454. As moving frame 444 is articulated from the out-of-the-way position to the use position, telescoping members 454 extend in an arc and support the upper edge of sides 438, 440 and the adjoining edges of top 426. The power unit 446 has a motor which is operable to articulate the moving frame 444 between a use position as shown in FIG. 12 and an out-of-the-way position as shown in FIG. 11. The guides 448, 450 provide a path for the articulation of moving frame 444. Two arms 447, 449 best seen in FIG. 11 are pivotably coupled to power unit 446 and pivot about horizontal axes 455 and 457 on either side of the bed 424 to provide protection and support a person to prevent their rolling out of the bed 424. The arms 447, 449 move between a use position shown in FIG. 11 and a stowed position as shown in FIG. 12. The power unit 446 is operated by user inputs 483 located on arm 447 or 449.

The bed 424 of the personal relaxation system is separated into individual sections 428, 430 which are independently articulable so that a person on either section 428, 430 may adjust the section to a desired position. The sections 428, 430 have multiple portions 432, 434, 436 in each section. Head portion 432, thigh portion 434, and leg portion 436 are independently articulable to multiple positions to allow a person on sections 428, 430 to adjust the section to a desired position. Each portion has independently operable temperature control and massage therapy so that a person can selectively choose to massage and provide temperature control to the appropriate portions of their sections. Additionally, each portion of each section has independently adjustable mattress firmness adjustment so as to allow a person to tailor the sleep surface portion's firmness to achieve relaxation. The operation of the personal relaxation system 420 is controlled by user inputs 483 located on which is configured to control all aspects of the personal relaxation system 420 including the power canopy, bed articulation, mattress portion firmness, massage control, bed temperature control, air temperature control, aromatherapy, air purification, sound, and video. Including the programming of a specific therapy profile for a particular time or particular user.

Maintaining personal hygiene and toileting independence are important aspects of maintaining a sense of independence for the mobility challenged individual. The ability to access a bathing or toileting apparatus with little or no intervention provides a high sense of independence as well assists making transitions comfortable for the mobility challenged. The present disclosure includes several embodiments of toileting and bathing systems which provide improved access for mobility challenged individuals.

Figure 14:
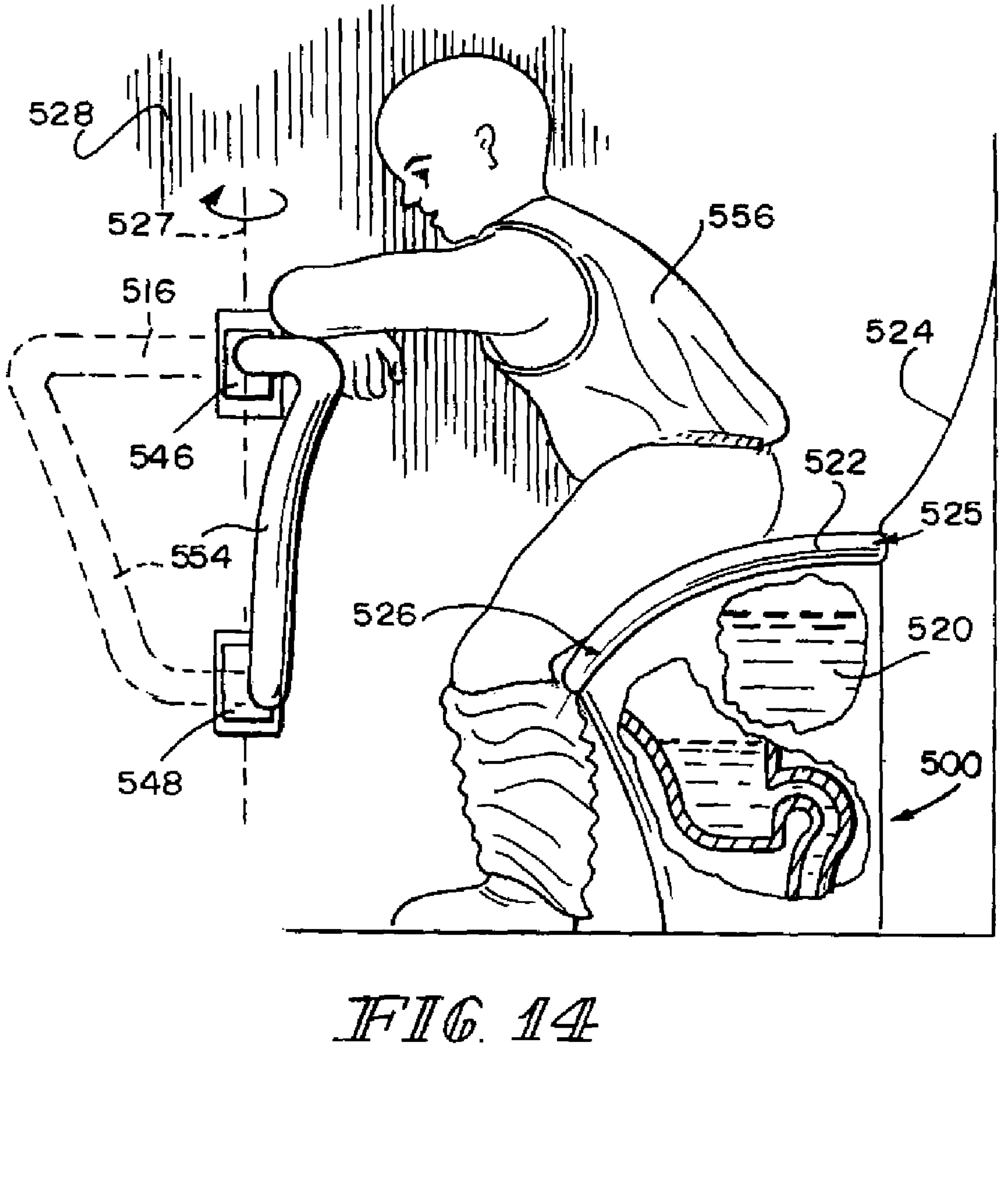
FIG. 14 shows a side view of a toilet area with a person seated on the seat of the toilet.

Referring now to FIG. 14, a toilet area has a person 556 seated on the seat 522 of the toilet 500. The toilet area has a toilet 500 and wall mounted hand rail 516. Toilet 500 includes an integrated toilet bowl and tank 520, a seat 522, and a lid 524. The wall mounted hand rail 16 includes pivot mounts 546, 548, and handle 554. The toilet 500 is taller than a standard toilet and seat 522 is angled or inclined such that a rear portion 525 of the seat 522 is higher in elevation than a front portion 526 of the seat 522. Thus, an elderly, incapacitated or mobility challenged person does not need to bend their knees as much as is required to sit on a standard height toilet, but rather the person is able to simply lean back onto the inclined seat 522. The wall mounted hand rail 516 is pivotably coupled to the pivot mounts 546, 548 and pivots about a substantially vertical axis 527. The hand rail 516 is pivoted between a use position as shown in solid in FIG. 14 wherein the handle 554 extends perpendicular from the wall 528 to form a support for the person 556 on the toilet 500 and an out-of-the-way position as shown in phantom. It should be understood a second hand rail 516 may be mounted on a wall opposite the wall 528 which is not shown in FIG. 14 so that the two hand rails 516 may be used in conjunction to provide support for the person 556 to mount and dismount the toilet 500.

Figure 15:
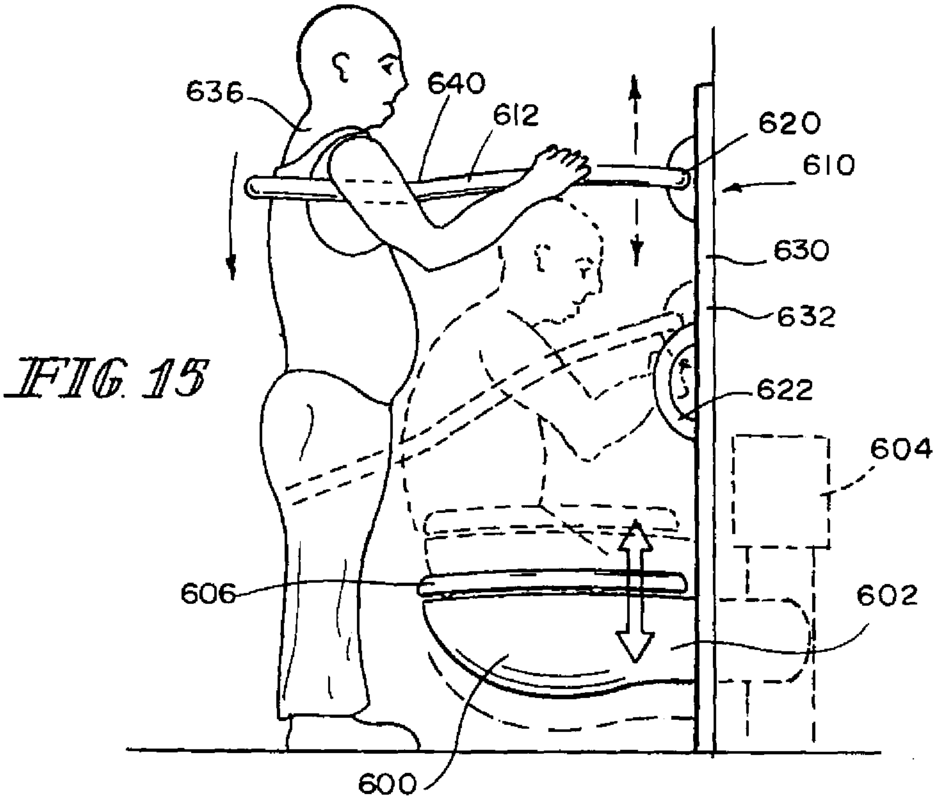
FIG. 15 is a side view showing a person using a toilet having an assist system in both standing and sitting positions.

Another embodiment of a toilet 600 wherein the toilet has a narrow bowl 602, a water tank 604, and seat 606 and is adjacent to an assist system 610 is shown in FIG. 15. The assist system 610 has an assist arms 612, a coupler 620 attached to a drive system (not shown), and an adjustable assist handles 622. The coupler 620 slides in a track 630 and is attached to a drive system which is retained inside of a housing 632. The drive system is operable to move the coupler 620 up or down along the track 630 and thereby the arm 612 moves vertically to provide powered assistance to a person 636 who is transitioning between a standing shown in solid and sitting position shown in phantom. The assist arm 612 has a soft grip handles 640 which are coupled to the arm 612 and provides a comfortable gripping surface. The assist arm 612 pivots vertically to the coupler 620 and the track 630 and have a number of yieldable locking positions for the assist arm 612 with respect to the couple 620. A toilet lid is omitted in FIG. 15.

The assist handle 622 is coupled to the track 630 and is moveable vertically to adjust to a desired position. The narrow bowl 602 is coupled to the track 630 and the height of the bowl 620 is adjustable vertically as shown in phantom, thus an elderly, incapacitated or mobility challenged person can easily slide from, such as a personal mobility device to the toilet bowl 602. The proper height of the bowl 602 allows the person sitting on the toilet to be in a comfortable knee position without having to bend their knees when the toilet is too low. While the illustrative embodiment of FIG. 15 shows only one side of the toilet area, it should be understood that assist arm 612 and assist handle 622 may be duplicated opposite the person 636 to provide support on both sides of the person 636.

Figure 16:
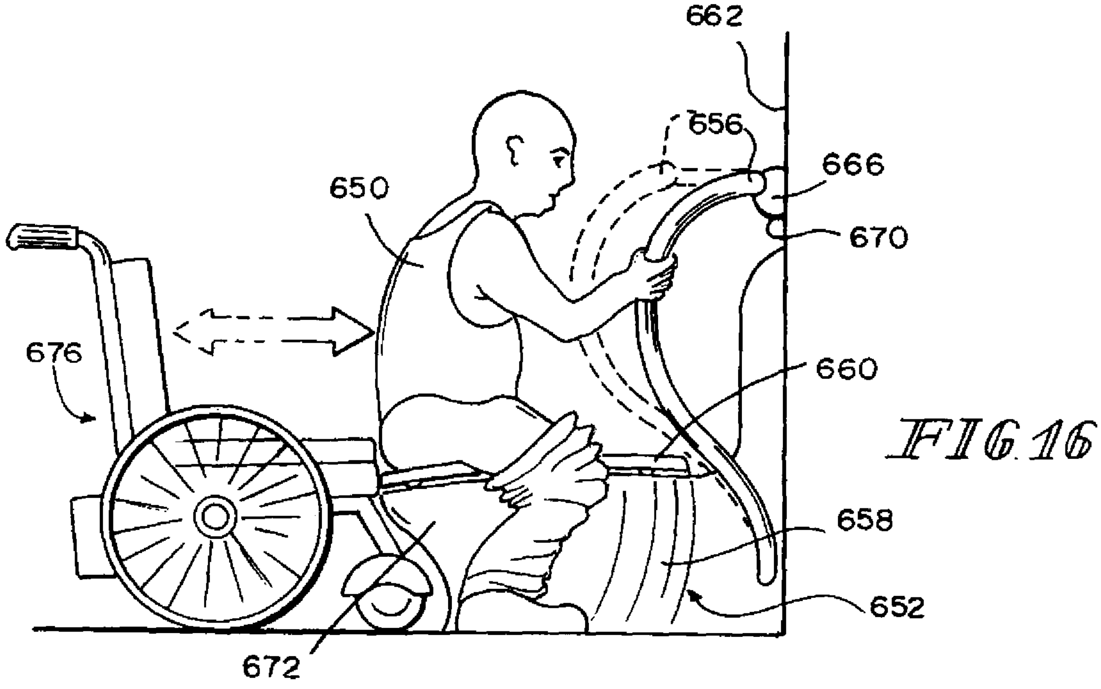
FIG. 16 is a perspective view of an embodiment of a toilet having front mount seat and a person sitting on the toilet and holding onto a wall-mounted hand rail.

FIG. 16 shows a side view of the person 650 seated on a toilet 652 and holding onto the wall mounted hand rail 656. The wall mounted hand rail 656 is coupled to the wall 662 by a coupler 666. The coupler 666 is attached to a structural member of the wall 670 to provide sufficient support to a person 650 who uses the wall mounted hand rail 656 to pull himself onto the toilet 652 from a personal mobility device as shown in FIG. 16. The toilet 652 has a bowl 658 and a seat 660. The toilet 652 and the seat 660 are configured to permit a person 650 to mount the toilet 652 while facing the wall 662 and utilizing the wall mounted hand rail 656. Toilet seat 660 and bowl 658 are longer from front to rear than a standard toilet. In addition, the front of seat 660 dips downwardly so that, if desired, a wheelchair bound person can urinate through a front portion 672 of the toilet seat opening without having to move off wheelchair 676 as shown or other personal mobility device onto toilet 658.

Figure 19:
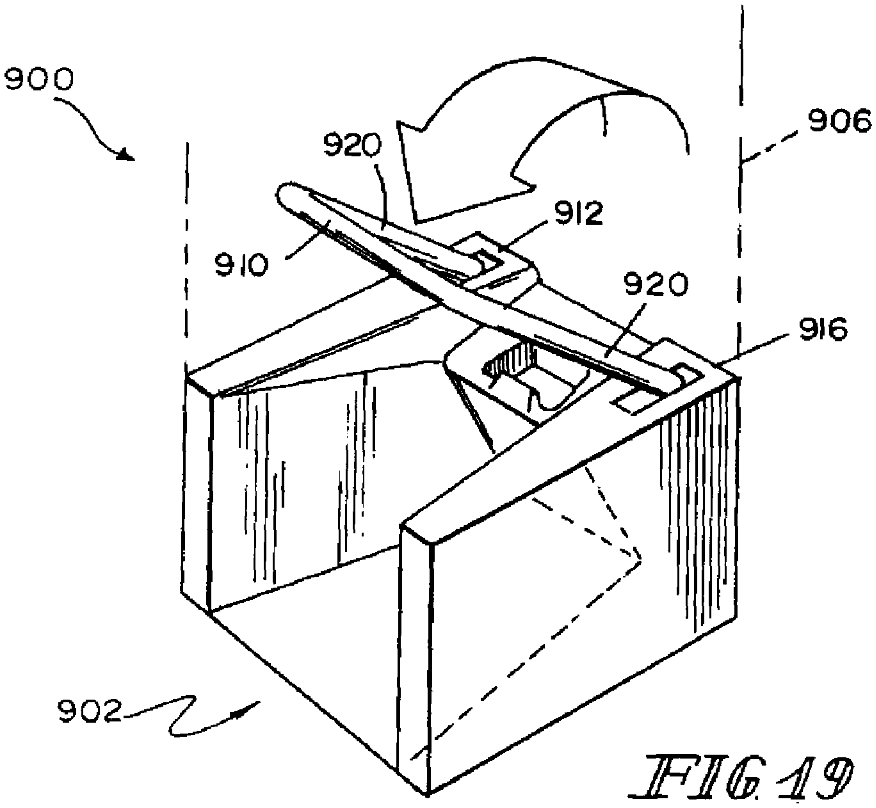
FIG. 19 is a perspective view of a toilet with an assist apparatus.

FIG. 19 shows still another embodiment of a toilet area 900 having a toilet 902 and an enclosure 906. The toilet area 900 further includes an assist apparatus 910, which is pivotably mounted to structures 912, 916, in the enclosure 906 of the toilet area 900. The assist apparatus 910 is pivotable between an out-of-the-way position wherein the arm 920 is substantially vertical to a use position wherein the arm 920 is positioned in a generally horizontal orientation in front of a person seated on the toilet 902. In the use position, arm 920 is utilized by a person to assist them with standing while showering.

Figure 20:
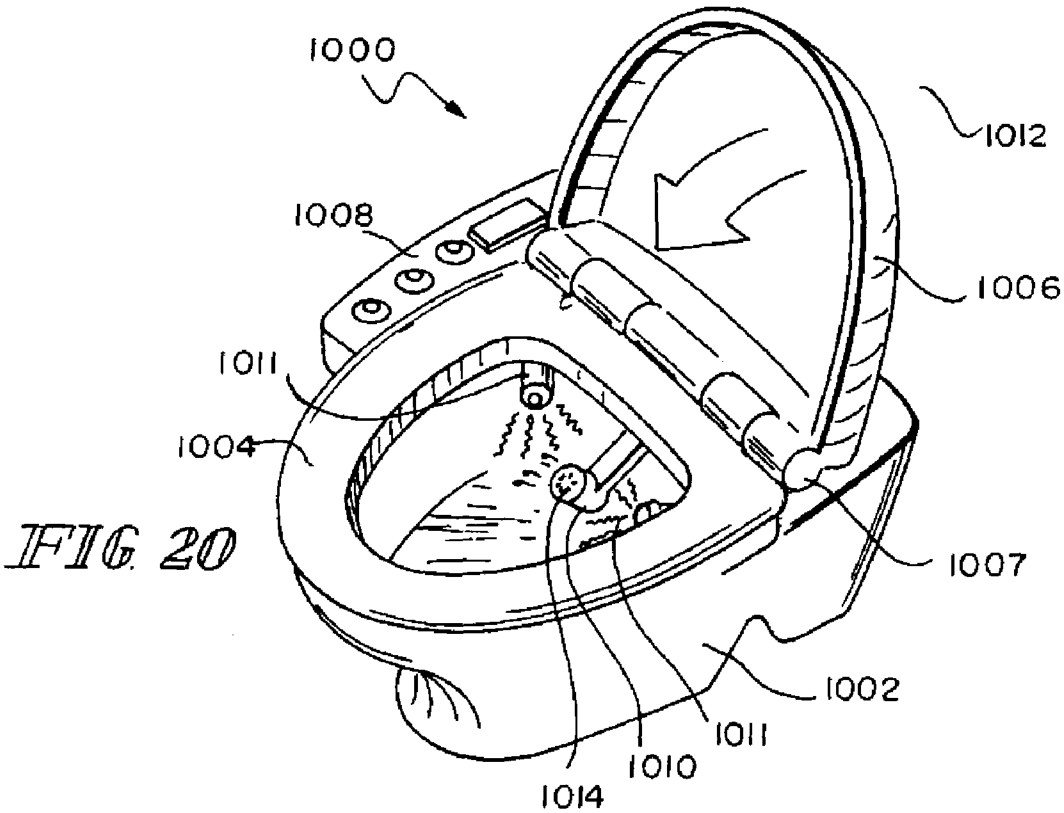
FIG. 20 is a perspective of a toilet having a sprayer and a blower system inside of the bowl.

FIG. 20 shows a wall mounted toilet 1000. The toilet 1000 has a bowl 1002, a seat 1004, a lid 1006, a control panel 1008, a sprayer 1010, and a blower system 1011. The seat 1004 and lid 1006 are coupled to the bowl 1002 and each pivot about a common horizontal axis 1007. The bowl 1002 is mounted to a wall 1012 and is slightly inclined in a manner similar to the illustrative embodiment of FIG. 14, however in this case the toilet 1000 is not floor mounted. The sprayer 1010 has several orifices 1014 which provide a stream of warm water onto a person sitting on the toilet to cleanse the person's skin. The blower system 1011 within the bowl 1002 blows warm air onto a person sitting on the toilet to dry the person's skin. The control panel 1008 is operable to control the flow and temperature of water from the sprayer 1010 and warm air from the blower system 1011. In some embodiments, the sprayer and blower system of the illustrative embodiment of FIG. 20 may be implemented in one of the other toilet embodiments described herein.

Figure 17:
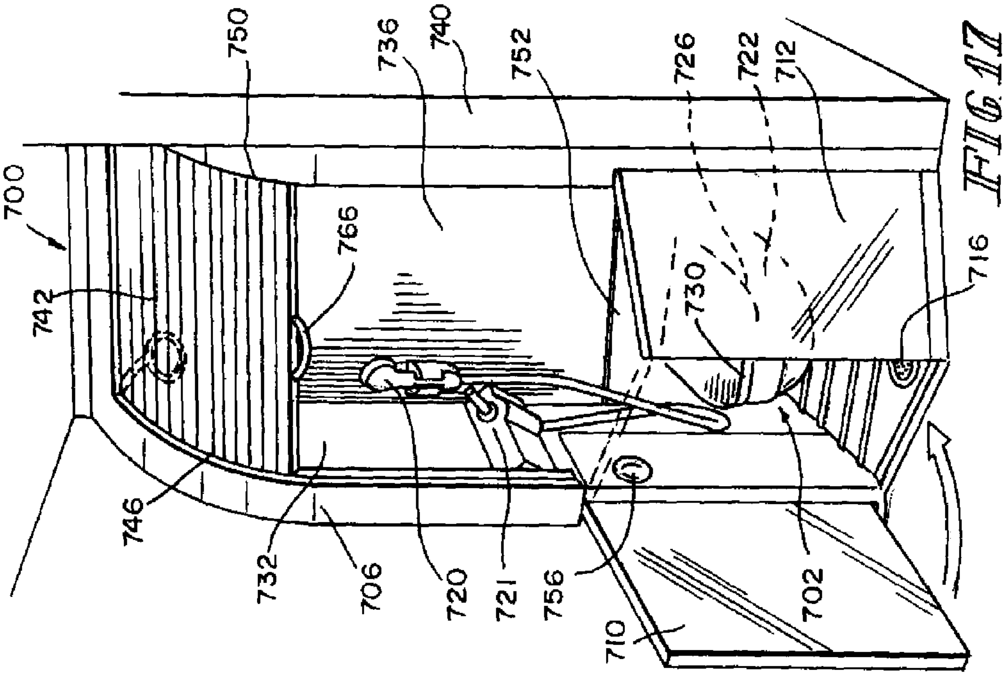
FIG. 17 is a perspective view of an embodiment of a combination toilet and shower with privacy and tambour doors.

In some instances, it may be appropriate to provide an area which provides for both toileting and bathing so as to reduce the need for multiple transfers for a person who is mobility challenged. One embodiment of a combination shower and toilet 700 is shown in FIG. 17. The shower/toilet 700 includes a toilet 702, an enclosure 706, two privacy doors 710, 712, a floor drain 716, a hand held sprayer 720, and a hand held sprayer switch 721. The toilet 702 includes a bowl 722, a seat 726, and a lid 730. The enclosure 706 has three walls 732, 736, 740, a tambour door 742, two door guides 746, 750, an integrated seat 752, and two handles 756, 760 (not shown). A tank (not shown) coupled to the bowl and contained within the integrated seat is also included. The integrated seat 752 is inclined to encourage water to flow off of the seat and to the floor drain 716. The privacy doors 710, 712 are pivotably mounted to the walls 732, 740 of the enclosure 706. The privacy doors 710, 712 are mounted such that when in a closed position, the doors 710, 712 engage with each other and the floor drain 716 such that a substantially water tight seal is formed to prevent water from the shower/toilet 700 from escaping.

The floor drain 716 comprises the entire area in the bottom of the shower/toilet 700. The floor drain 716 is slightly concave so that the water is directed to the drainage hole 762. The entire floor drain 716 has a non-skid surface to reduce the potential for slipping on the floor drain 716 when it is wet. The tambour door 742 has a handle 766. When the tambour door handle 766 is pulled downwardly or pushed upwardly, the tambour door 742 glides through the door guides 746, 750 to close or open. When a person uses toilet 702, privacy doors 710, 712 may be closed by the person, if desired. When a person showers, privacy doors 710, 712 are closed and tambour door 742 is pulled downwardly so that a lower portion of door 742 is adjacent to privacy doors 710, 712 to form a tight water seal.

Figure 18:
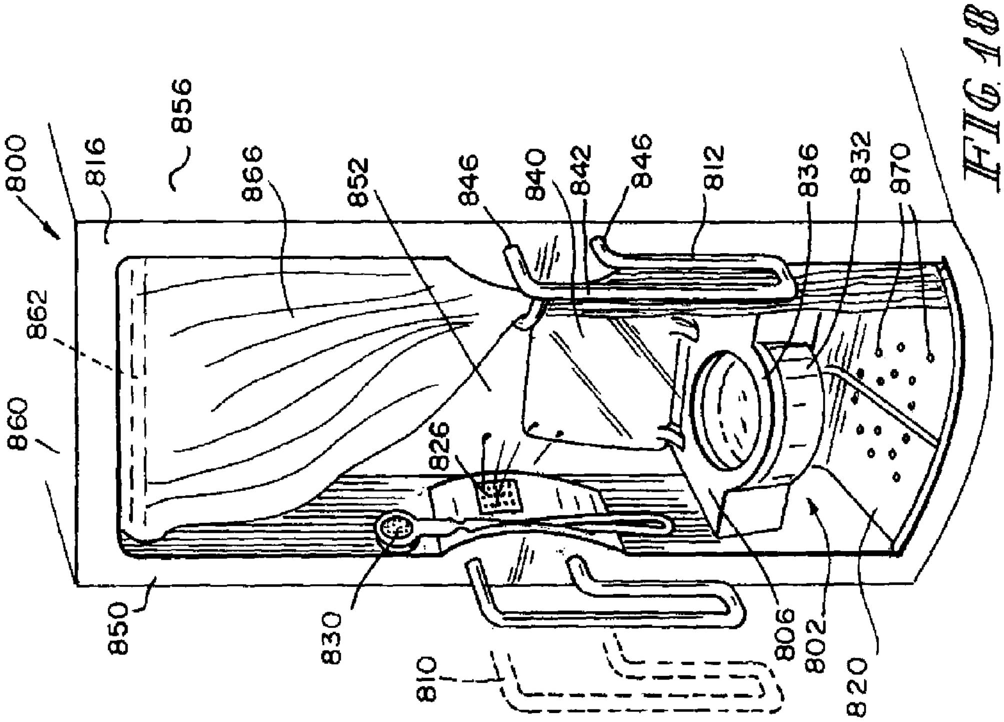
FIG. 18 is a perspective view of another embodiment of a combination toilet and shower.

Another embodiment of a combination shower and toilet 800 is shown in FIG. 18. The shower/toilet 800 includes a toilet 802, an integrated seat 806, two wall mounted pivoting hand rails 810, 812, an enclosure 816, a floor drain 820, a pair of wall mounted spray heads 826, 828 (not shown), and a movable hand held spray head 830. The wall mounted hand rails 810, 812 pivot in a substantially vertical direction so that the hand rails 810, 812 are in best position as a person moves into or from the shower and toilet combination 800. The toilet 802 has a bowl 832, a seat 836, and a lid 840. The wall mounted pivoting hand rails 810, 812 include an arm 842, and two pivots 846. The enclosure 816 has three sides 850, 852, 856, a top 860, a curtain rod 862, and a curtain 866. The floor drain 820 has several holes 870. The floor drain 820 is slightly concave so as to encourage water to drain to the holes. The integrated seat 806 is coupled to toilet 802 to provide a bench with a substantially continuous seating surface when the lid 840 is down. The integrated seat 806 is coupled to the sides 850, 852, 856 of the enclosure 816. The integrated seat 806 and lid 840 are slanted forward to encourage the flow of water down to the floor drain 820. Mechanisms to raise and lower the bench provide by toilet 802 and seat 807 relative to enclosure 816 are provided in some embodiments.

Bathing is an essential daily life task and is of prime concern to persons of limited mobility in maintaining their independence. Various assistance devices and adaptations to bathing apparatuses are described herein which provide persons of limited mobility a sense of independence in the process of bathing.

Figure 21:
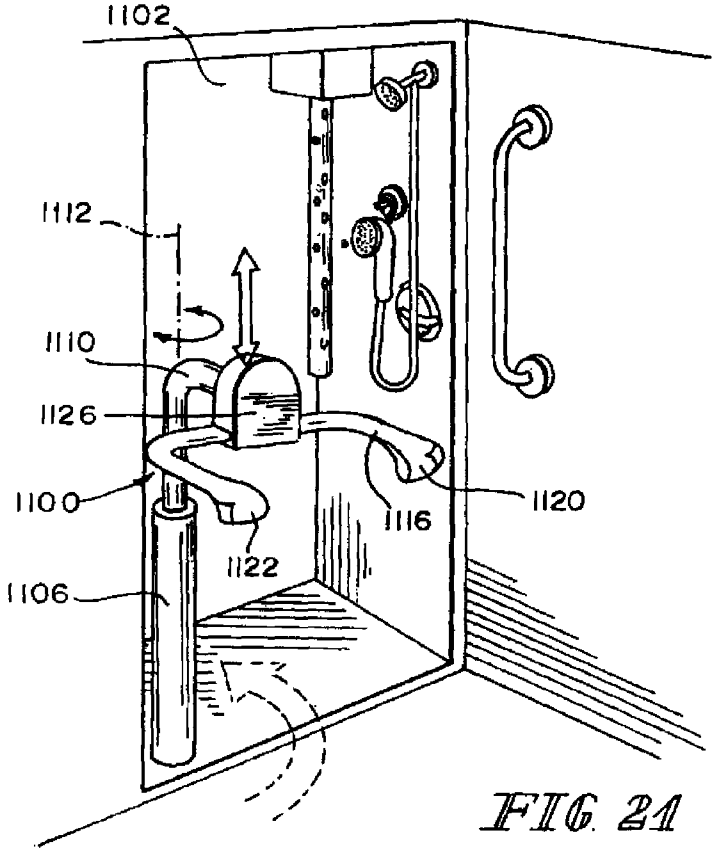
FIG. 21 is a perspective view of a shower having an assistance device.

For example, an assistance device 1100 to provide support for a person in a shower is shown in FIG. 21. The assistance device 1100 is an articulable armrest apparatus shown in a shower stall 1102. The assistance device 1100 has a mount 1106, a support 1110 telescoping from the mount 1106, and an assist portion 1116. The support 1110 is pivotable relative to the mount 1106 about a vertical axis 1112 to assist a person in moving from outside of shower stall 1102 to inside of shower stall 1102. The assist portion 1116 is coupled to the support 1110 and has a back rest 1126 and two arms 1120, 1122 extending from the back rest 1126.

The support 1110 is a j-shape with the long leg of the j telescoping from the mount 1106 and the shorter leg of the j coupled to the assist portion 1116 at the bracket 1130 (not shown). The telescoping of the support 1110 within the mount 1106 is accomplished by a linear actuator (not shown) which may be operated by the person utilizing the assistance device 1100 or by another person who is to help the person using the assistance device 1100 inside the shower stall 1102. The linear actuator is an electromechanical device connected between the mount 1106 and the support 1110. Other devices for linear actuation may be employed such as hydraulic cylinders, pneumatic cylinders, or the like. The controls of the actuation are not shown, but may be located on one of the arms 1120, 1122 of the assist portion 1116, or may be located on the wall next to the assistance device 1100. The assist device 1100 may be utilized to assist a person to transition between standing and sitting positions or may be used as a support for a person in a standing position such as in the shower stall 1102. The assistance device 1100 is substantially waterproof and electrically isolated for safety. The assistance device 1100 of the illustrative embodiment of FIG. 21 is illustratively shown in a shower stall 1102, however, the assistance device may be located at any location within a home where a transition between standing and sitting or support while standing may be needed.

Figure 22:
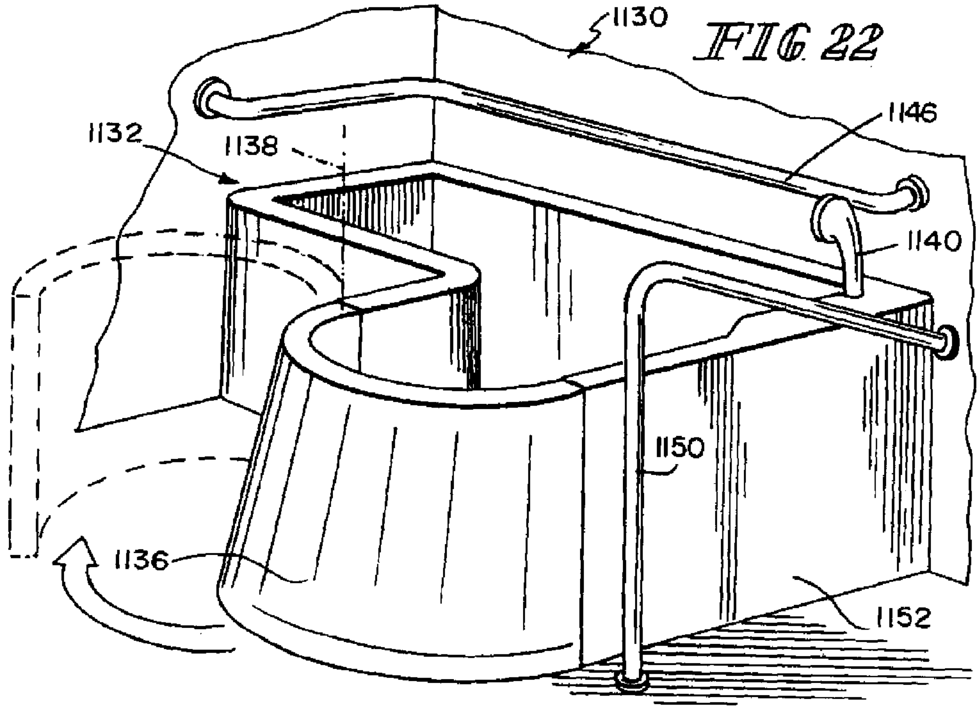
FIG. 22 is a perspective view of a bathing apparatus with egress area and ingress/egress assist bars.

FIG. 22 shows another embodiment of a bathing apparatus 1130 which is wheelchair accessible. The bathing apparatus 1130 includes a main body 1132, a door 1136, a spray head 1140, a horizontal assist bar 1146, and an ingress/egress assist bar 1150. The door 1136 is pivotably coupled to the main body 1132 and pivots open to an out-of-the-way position shown in phantom at a substantially vertical axis 1138. A wall portion 1152 extends from the main body 1132 and joins the door 1136 when the door 1136 is in the use position shown in solid. The door 1136 is generally semicircular in shape and surrounds an egress area where a person can stand to dry off after bathing, if desired. The main body 1132 is substantially rectangular shaped in a manner similar to traditional bath tubs, but with semicircular door 1136 and associated wall portion 1152. The joined egress and bathing areas make the bathing apparatus 1130 L-shaped. If preferred, a person can sit in the main body as he would sit in a traditional tub. The door 1136 provides adequate clearance for a person to occupy a wheelchair or other support inside to of the bathing apparatus 1130.

Figure 23:
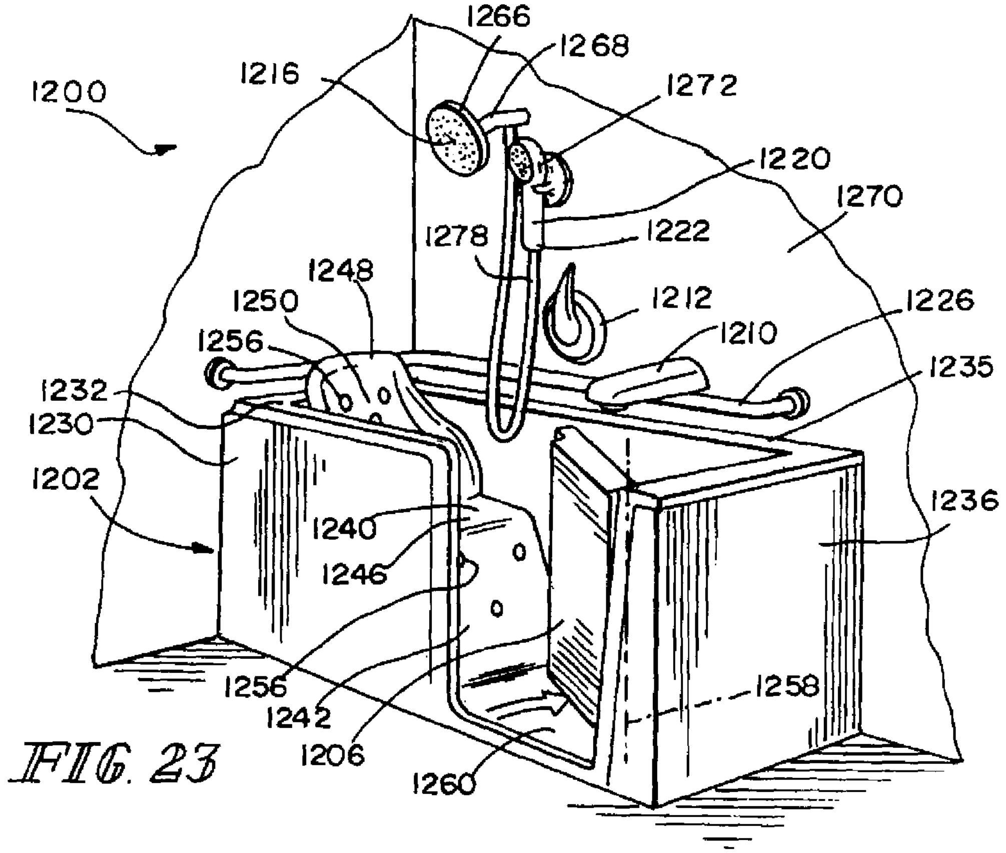
FIG. 23 is a perspective view of another embodiment of a bathing apparatus, the apparatus having a movable shower head and sitting area.

Yet another embodiment of a bathing apparatus 1200 is shown in FIG. 23. Bathing apparatus 1200 comprises a main body 1202, a door 1206, a fill spout 1210, a flow selector 1212, a fixed spray head 1216, a flexible moveable spray head 1220, a spray head holder 1222, a horizontal assist bar 1226, and a drain (not shown). The main body 1202 has four sides 1230, 1232, 1235, 1236, and an integrated seat 1240. The integrated seat 1240 has a leg support 1242, a seat 1246, a back rest 1248, and two abdominal supports 1250, 1252 (not shown). The leg support 1242 and the back rest 1248 both have multiple spray nozzles 1256. The internal surface of main body 1202 is covered by a soft material to provide comfort to a person using the bathing apparatus 1200. The internal surface of main body 1202 is a non-skid surface in some embodiments, so as to reduce the potential of slipping when the surface is wet.

The door 1206 is coupled to the side 1230 of main body 1202 so as to pivot at a substantially vertical axis 1258 from an open position shown in FIG. 23 to a closed position (not shown) which obstructs an opening 1260 in side 1230 of the main body 1202. When closed, the door 1206 forms a substantially water-tight seal with side 1230 so as to prevent leaking of water from the bathing apparatus 1200 when it is in use.

Fill spout 1210 is located on a wall 1235 and oriented to fill the main body of the bathing apparatus 1200 near the feet of a person occupying the bathing apparatus 1200. The flow selector 1212 is a typical mixing selector permitting a person to infinitely adjust the mix of hot and cold water. There is a selector (not shown) which allows the person to select the outlet for flow (i.e. fill spout 1210, fixed spray head 1216, or flexible moveable spray head 1220). Fixed spray head 1216 is located above main body 1202 and is directed at the integrated seat 1240 area. The fixed spray head 1216 is directable in various directions. The fixed spray head 1216 has an adjustable head portion 1266 which permits a user to vary the intensity of the flow from the fixed spray head 1216. The head portion 1266 is coupled to an extension 1268 which is coupled to plumbing behind wall 1270. The flexible moveable spray head 1220 has a head portion 1272, a body 1276, and a hose 1278. The head portion 1272 is adjustable to allow a user to vary the intensity of flow from the flexible moveable spray head 1220. The body 1276 is ergonomically shaped to facilitate ease of use. The hose 1278 is coupled to the extension 1268 of fixed spray head 1216 at a bypass valve (not shown) which permits flow through extension 1268 to be directed to either fixed spray head 1216 or moveable spray head 1220.

Figure 24:
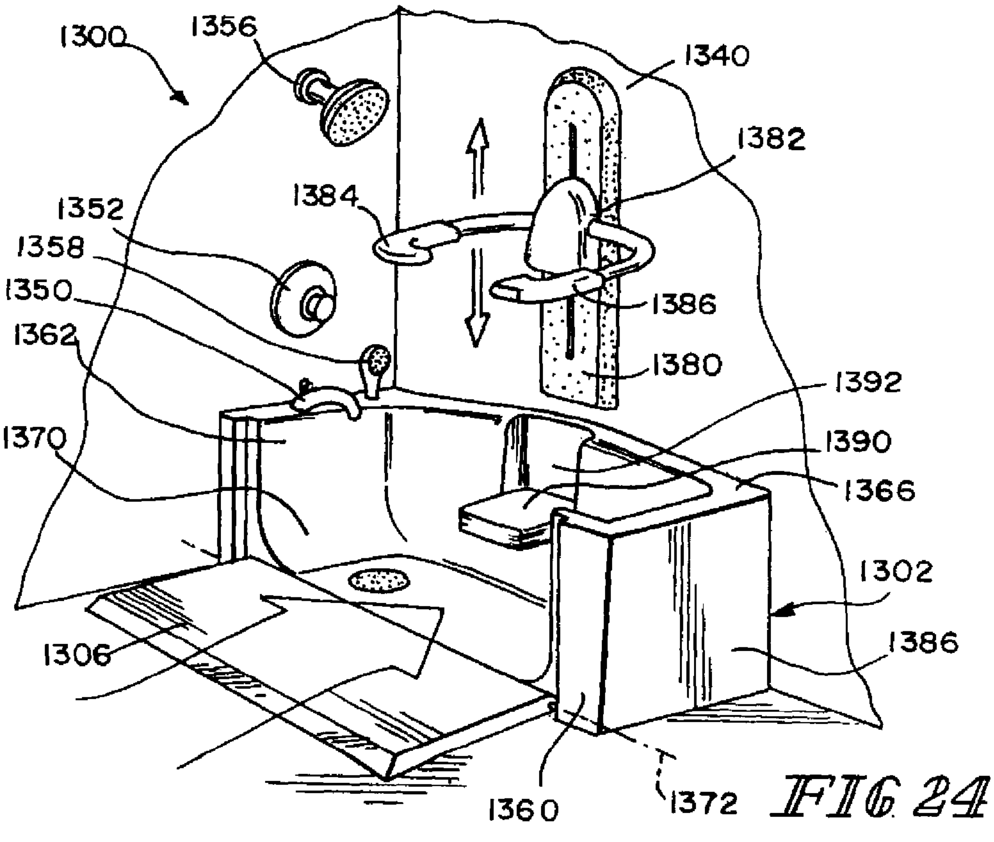
FIG. 24 is a perspective view of another embodiment of a bathing apparatus, the apparatus having a powered door, a fold-down seat and an assist device.

Yet still another embodiment of a bathing apparatus 1300 is shown in FIG. 24. Bathing apparatus 1300 has a main body 1302, a powered door 1306, a powered assist 1340, a fill spout 1350, a flow selector 1352, a fixed spray head 1356, and a moveable spray head 1358. The main body 1302 has four sides 1360, 1362, 1366, 1368. Side 1360 has an opening 1370 configured to receive powered door 1306. Powered door 1306 is coupled to the side 1360 at a substantially horizontal axis 1372 and is configured to serve as an entryway when in a lowered position as shown in FIG. 24. When a person is in the bathing apparatus 1300, a power switch (not shown) is engaged to rotate the door vertically to a closed position (not shown). In the closed position (not shown), the powered door 1306 forms a substantially water-tight seal with side 1360 so as to prevent leaking of water from the bathing apparatus 1300 when it is in use. When in the closed position, powered door 1306 engages side 1360 so as to form a substantially water tight seal. Fill spout 1350, flow selector 1352, fixed spray head 1356, and moveable spray head 1358 all function in substantially the same manner as disclosed in the illustrative embodiment of FIG. 23. The powered assist 1340 has a drive 1380, a coupling 1382, and two assist arms 1384, 1386. Coupling 1382 and the arms 1384, 1486 are driven vertically by drive 1380. The controls for powered assist 1340 are located on one or both of arms 1384, 1386. The bathing apparatus 1300 has a fold down seat 1390 which is coupled to side 1366 of main body 1302 and pivots in a substantially horizontal axis (not shown) between a use position as shown in FIG. 24 and a stowed position wherein the seat 1390 is received in a cut out area 1392 of the side 1366.

Figure 25:
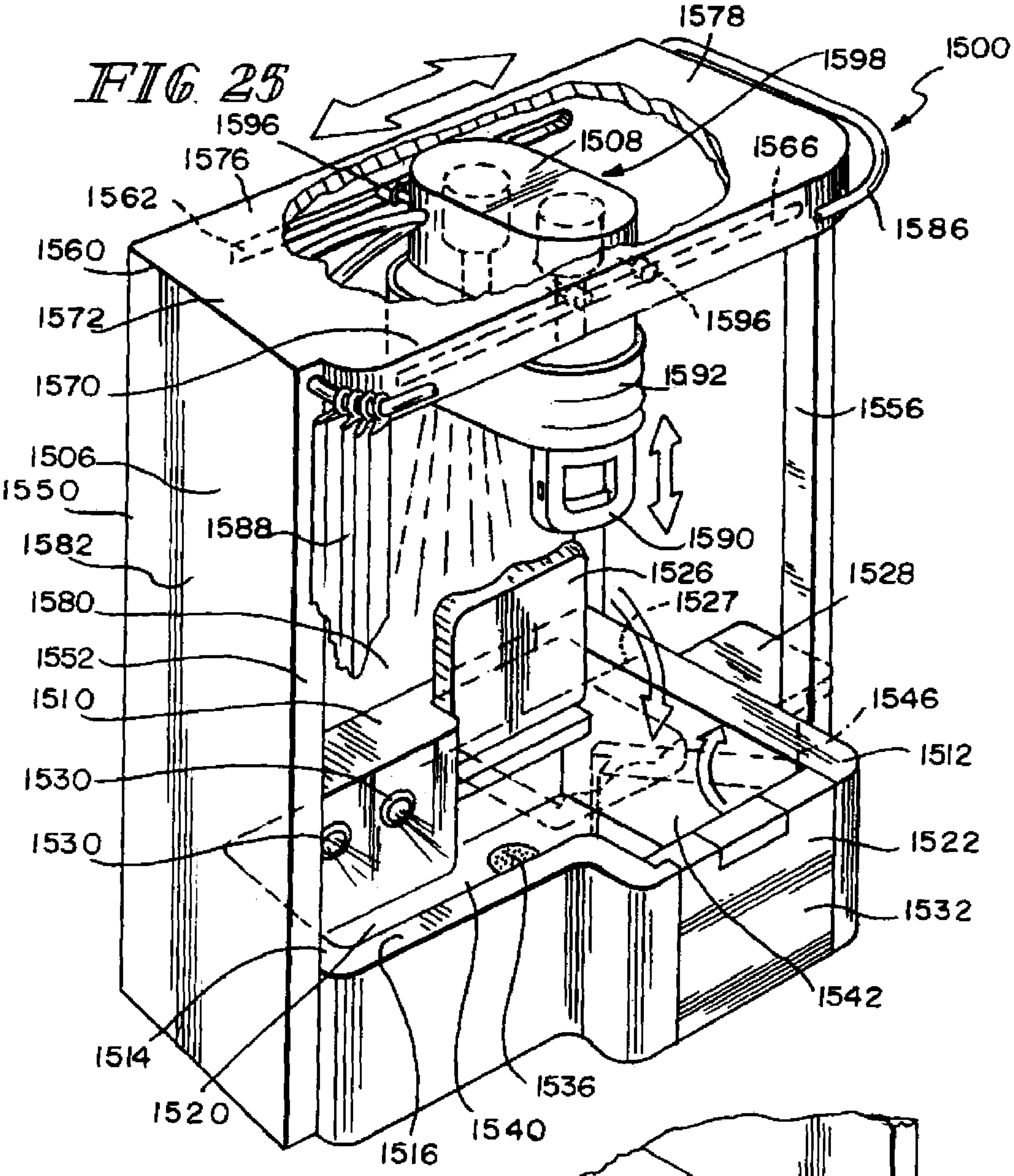
FIG. 25 is a perspective view of an embodiment of a combination shower and bath, with a fold-down seat, a sliding tray, an ingress-egress area, and with the shower being attached to a powered lift device.

Referring now to FIG. 25, another embodiment of a bathing apparatus 1500 having a tub portion 1502, a frame portion 1506, and a shower portion 1508 is shown. The tub portion 1502 has four sides 1510, 1512, 1514, 1516, a bottom 1520, a door 1522, a fold down seat 1526, a sliding tray 1528, several spray nozzles 1530, an opening 1532, and a drain 1536. The four sides 1510, 1512, 1514, and 1516 are coupled to the bottom 1520 to create a tub cavity 1540. The drain 1536 is coupled to the bottom 1520 and communicates water from the tub cavity 1540 to a service drain (not shown). The tub portion 1502 is L-shaped so as to create an ingress/egress area 1542 where the opening 1532 is located. This provides clearance for the door 1522 to pivot between an open position shown in phantom and a closed position shown in solid. The door 1522 is pivotably coupled to side 1512 and pivots about a vertical axis 1546. When in the closed position, the door 1522 engages side 1516 such that a substantially water tight seal is formed. A seat 1526 is pivotably coupled to side 1510 and pivots about a horizontal axis 1527 between a stowed position, shown in solid, wherein the seat is retained in a cutout area of side 1510 to a use position shown in phantom where the surface of seat 1526 is substantially horizontal. When in the use position the seat 1526 is located such that a person can back into the opening 1532 of the tub portion 1502 and seat himself on seat 1526. The spray nozzles 1530 provide a flow of water into the tub portion 1502 and also provide massage therapy for a person occupying the tub portion 1502. The interior surfaces of tub 1502 have a surface texture which reduces the potential for slipping when the surfaces are wet.

The frame portion 1506 has four legs 1550, 1552, 1556, 1558 (not shown), an upper frame 1560, and two tracks 1562, 1566. The legs 1550, 1552, 1556, 1558, are all located outside of the tub portion 1502 and all are fixed to the floor. The upper frame 1560 is coupled to all four legs 1550, 1552, 1556, and 1558. In addition two tracks 1562, 1566, the upper frame has four members 1570, 1572, 1576, 1578. Members 1570 and 1576 are parallel to each other and parallel to the longitudinal length of the tub portion 1502. The members 1572 and 1578 are parallel to each other and connect to members 1570 and 1576 at each end. The bathing apparatus 1500 has two walls 1580, 1582, 1580 being adjacent to side 1514 and 1582 being adjacent to side 1510. The two walls 1580 and 1582 provide partial enclosure of the bathing apparatus 1500. The curtain 1588 slides along a curtain rod 1586. The curtain rod 1586 is curved and extends around the open portion of the bathing apparatus 1500. The two walls 1580, 1582, and the curtain 1588 provide a complete enclosure for the bathing apparatus 1500.

The shower portion 1508 has a handle 1590, a lift 1592, rollers 1596, a body 1598, and shower head (not shown). The rollers 1596 are coupled to the body 1598 and roll along tracks 1562 and 1566 so as to allow the shower portion 1508 to move longitudinally over the tub portion 1502. The lift 1592 is operable to change the elevation of the handle 1590 and provide lift assistance to a person in the bathing apparatus 1500. The person can grip the handle 1590 and be lifted by the lift 1592 to assist him in standing or to assist him in and moving from a standing position to a seated position.

Figure 26:
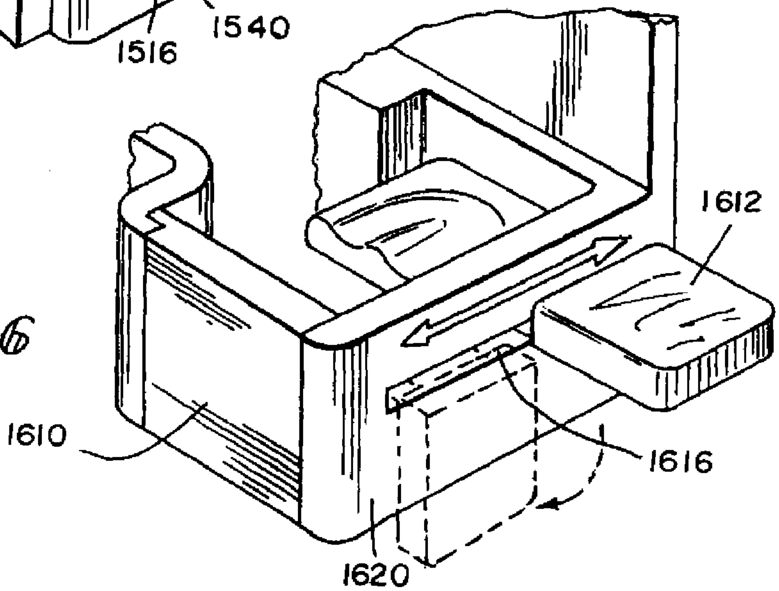
FIG. 26 is a perspective view of a bath tub, with a foldable sliding seat and an integrated seat.

FIG. 26 shows an embodiment of a bathing apparatus 1610 with a sliding seat 1612 to be used by an assistant assisting a person utilizing bathing apparatus 1610. The sliding seat 1612 is pivotably coupled to a guide (not shown) which is retained in track 1616. The sliding seat 1612 can pivot from the use position shown in solid down to a stowed position as depicted by the arrow and shown in phantom. The seat 1612 also moves along side 1620 of the tub 1610 as the guide slides along track 1616. The sliding seat's pivoting and movement along track 1616 is lockable by a locking mechanism (not shown).

Although certain illustrative embodiments have been described in detail above, variations and modifications exist within the scope and spirit of this disclosure as described and as defined in the following claims.

The invention claimed is:

1. A person support apparatus comprising a frame, a seat supported on the frame, at least one drive roller having a spherical surface, the drive roller supporting a portion of the frame and engaging a surface supporting the person support apparatus, a first driver including a first motor and a first drive wheel driven by the first motor, the first drive wheel engaged with the surface of the drive roller such that the first driver drives the drive roller in first and second directions about a first axis parallel to the surface supporting the person support apparatus, a second driver including a second motor and a second drive wheel driven by the second motor, the second drive wheel engaged with the surface of the drive roller such that the second driver drives the drive roller in first and second directions about a second axis parallel to the surface supporting the person support apparatus, the second axis not parallel to the first axis, and a controller controlling the speed and direction of the first and second drivers to control the movement of the person support apparatus over the surface.

2. The person support apparatus of claim 1, wherein the person support apparatus further comprises a control input operable by a user to provide an input to the controller indicative of the desired speed and direction of travel.

3. The person support apparatus of claim 2, wherein the control input comprises a ball-style multi-directional control input.

4. The person support apparatus of claim 1, wherein the controller drives the first driver at a first speed and the second driver at a second speed to thereby cause the drive roller to move in a direction that is the resultant of the variation in speed of the first and second drivers.

5. The person support apparatus of claim 4, wherein the controller drives the first driver in a first direction and the second driver in a second direction to thereby cause the drive roller to move in a direction that is the resultant of the variation in speed and direction of the first and second drivers.

6. The person support apparatus of claim 1, wherein the controller drives the first driver in a first direction and the second driver in a second direction to thereby cause the drive roller to move in a direction that is the resultant of the variation in direction of the first and second drivers.

7. The person support apparatus of claim 1, wherein the frame is supported by a plurality of legs, each leg including at least one drive roller having a spherical surface, the drive roller supporting a portion of the frame and engaging a surface supporting the person support apparatus, a first driver including a first motor and a first drive wheel driven by the first motor, the first drive wheel engaged with the surface of the drive roller such that the first driver drives the drive roller in first and second directions about a first axis parallel to the surface supporting the person support apparatus, and a second driver including a second motor and a second drive wheel driven by the second motor, the second drive wheel engaged with the surface of the drive roller such that the second driver drives the drive roller in first and second directions about a second axis parallel to the surface supporting the person support apparatus, the second axis not parallel to the first axis.

8. The person support apparatus of claim 7, wherein the controller drives the first and second drivers of each leg to control movement of the person support apparatus over the surface supporting the person support apparatus.

9. The person support apparatus of claim 8, wherein the person support apparatus comprises two legs spaced apart such that the respective drive rollers engage the surface supporting the person support apparatus at first and second points spaced apart from one another, the controller coordinating the speed and direction of each of the first and second drivers such that movement of the person support apparatus is controlled by the compound effect of the speed and direction of rotation of each of the drive rollers.

10. The person support apparatus of claim 9, wherein the controller varies the spacing between the legs based on the horizontal location of the center of gravity of a person supported on the person support apparatus.

11. The person support apparatus of claim 9, wherein the controller compensates for variations in the loads supported by the legs to vary the spacing of the drive rollers.

12. The person support apparatus of claim 11, wherein the person support apparatus further comprises a transfer driver extendable from the frame.

13. A person support apparatus comprising a frame, a plurality of legs supporting the frame, each leg comprising at least one drive roller having a spherical surface, a first driver operable to drive the drive roller in first and second directions at variable speeds, and a second driver operable to drive the drive roller in third and fourth directions at variable speeds, wherein each leg is movable to vary the position of each drive roller relative to each other drive roller, and a controller varying the speed and direction of each of the first and second drivers of each leg to control movement of the person support apparatus.

14. The person support apparatus of claim 13, wherein the position of each drive roller is varied based on the position of the load supported on the person support apparatus.

15. The person support apparatus of claim 14, wherein the controller varies the position of each drive roller responsive to the position of the load supported on the person support apparatus.

16. The person support apparatus of claim 15, wherein the person support apparatus further comprises a transfer driver extendable from the frame.

17. The person support apparatus of claim 13, wherein the person support apparatus further comprises a control input operable by a user to provide an input to the controller indicative of the desired speed and direction of travel.

18. The person support apparatus of claim 17, wherein the control input comprises a ball-style multi-directional control input.

19. The person support apparatus of claim 13, wherein the controller drives the first driver of each drive roller at a first speed and the second driver of each drive roller at a second speed to thereby cause the drive roller to move in a direction that is the resultant of the variation in speed of the first and second drivers.

20. The person support apparatus of claim 19, wherein the controller drives the first driver of each drive roller in a first direction and the second driver of each drive roller in a second direction to thereby cause the person support apparatus to move in a direction that is the resultant of the variation in speed and direction of the first and second drivers.

* * * * *